US012106613B2

(12) United States Patent
Calmer et al.

(10) Patent No.: US 12,106,613 B2
(45) Date of Patent: Oct. 1, 2024

(54) DYNAMIC DELIVERY OF VEHICLE EVENT DATA

(71) Applicant: Samsara Inc., San Francisco, CA (US)

(72) Inventors: Mathew Chasan Calmer, Sacramento, CA (US); Jesse Chen, San Francisco, CA (US); Saumya Jain, San Francisco, CA (US); Kavya Joshi, Mammoth Lakes, CA (US); Justin Pan, San Francisco, CA (US); Ryan Milligan, Great Falls, VA (US); Justin Delegard, West Chester, OH (US); Jason Symons, Dublin, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/322,948

(22) Filed: May 24, 2023

(65) Prior Publication Data

US 2023/0298410 A1 Sep. 21, 2023

Related U.S. Application Data

(63) Continuation of application No. 17/726,386, filed on Apr. 21, 2022, now Pat. No. 11,688,211, which is a (Continued)

(51) Int. Cl.
*G07C 5/00* (2006.01)
*G07C 5/08* (2006.01)

(52) U.S. Cl.
CPC .......... *G07C 5/008* (2013.01); *G07C 5/0808* (2013.01); *G07C 5/0816* (2013.01); *G07C 5/0866* (2013.01)

(58) Field of Classification Search
CPC .... G07C 5/008; G07C 5/0866; G07C 5/0808; G07C 5/0816
See application file for complete search history.

(56) References Cited

U.S. PATENT DOCUMENTS 4,110,605 A * 8/1978 Miller .................. G01M 1/127
73/65.06
4,622,639 A * 11/1986 Adelson ................ G01M 1/127
73/65.06

(Continued)

FOREIGN PATENT DOCUMENTS

CN 108446600 A 8/2018
CN 110766912 A 2/2020

(Continued)

OTHER PUBLICATIONS

US 11,450,210 B2, 09/2022, Tsai et al. (withdrawn)

(Continued)

*Primary Examiner* — Mussa A Shaawat
(74) *Attorney, Agent, or Firm* — Knobbe, Martens, Olson & Bear, LLP

(57) ABSTRACT

An improved system and method of selectively transmitting asset data from one or more sensors associated with the vehicle to a backend server, which is configured to analyze the asset data and, if necessary for further analysis of the asset data (e.g., to determine whether a safety event has occurred) and/or to provide actionable data for review by a safety analyst, requests further asset data from a vehicle device.

20 Claims, 7 Drawing Sheets

Related U.S. Application Data continuation of application No. 17/346,801, filed on Jun. 14, 2021, now Pat. No. 11,341,786.

(60) Provisional application No. 63/113,645, filed on Nov. 13, 2020.

(56) References Cited

U.S. PATENT DOCUMENTS 4,671,111 A 6/1987 Lemelson
5,825,283 A 10/1998 Camhi
5,917,433 A 6/1999 Keillor et al.
6,064,299 A 5/2000 Lesesky et al.
6,098,048 A 8/2000 Dashefsky et al.
6,157,864 A 12/2000 Schwenke et al.
6,253,129 B1 6/2001 Jenkins et al.
6,308,131 B1 * 10/2001 Fox ........................ G01G 19/07 177/136
6,317,668 B1 11/2001 Thibault et al.
6,393,133 B1 5/2002 Breed et al.
6,411,203 B1 6/2002 Lesesky et al.
6,421,590 B2 7/2002 Thibault
6,452,487 B1 9/2002 Krupinski
6,505,106 B1 1/2003 Lawrence et al.
6,651,063 B1 11/2003 Vorobiev
6,668,157 B1 * 12/2003 Takeda ................... H04B 7/155 701/50
6,714,894 B1 3/2004 Tobey et al.
6,718,239 B2 4/2004 Rayner
6,741,165 B1 5/2004 Langfahl et al.
6,801,920 B1 10/2004 Wischinski
7,117,075 B1 10/2006 Larschan et al.
7,139,780 B2 11/2006 Lee et al.
7,209,959 B1 4/2007 Campbell et al.
7,233,684 B2 6/2007 Fedorovskaya et al.
7,386,376 B2 6/2008 Basir et al.
7,389,178 B2 6/2008 Raz et al.
7,398,298 B2 7/2008 Koch
7,492,938 B2 2/2009 Brinson, Jr. et al.
7,526,103 B2 4/2009 Schofield et al.
7,555,378 B2 6/2009 Larschan et al.
7,596,417 B2 9/2009 Fister et al.
7,606,779 B2 10/2009 Brinson, Jr. et al.
7,715,961 B1 5/2010 Kargupta
7,769,499 B2 8/2010 McQuade et al.
7,844,088 B2 11/2010 Brinson, Jr. et al.
7,859,392 B2 12/2010 McClellan et al.
7,877,198 B2 1/2011 Tenzer et al.
7,881,838 B2 2/2011 Larschan et al.
7,957,936 B2 6/2011 Eryurek et al.
8,019,581 B2 9/2011 Sheha et al.
8,024,311 B2 9/2011 Wood et al.
8,032,277 B2 10/2011 Larschan et al.
8,140,358 B1 3/2012 Ling et al.
8,156,108 B2 4/2012 Middleton et al.
8,156,499 B2 4/2012 Foulger et al.
8,169,343 B2 5/2012 Sheha et al.
8,175,992 B2 5/2012 Bass, II et al.
8,230,272 B2 7/2012 Middleton et al.
8,260,489 B2 9/2012 Nielsen et al.
8,417,402 B2 4/2013 Basir
8,442,508 B2 5/2013 Harter et al.
8,457,395 B2 6/2013 Boncyk et al.
8,509,412 B2 8/2013 Sheha et al.
8,515,627 B2 * 8/2013 Marathe .................. E02F 3/431 701/50
8,543,625 B2 9/2013 Middleton et al.
8,560,164 B2 10/2013 Nielsen et al.
8,615,555 B2 12/2013 Koch
8,625,885 B2 1/2014 Brinson, Jr. et al.
8,626,568 B2 1/2014 Warkentin et al.
8,633,672 B2 1/2014 Jung et al.
8,669,857 B2 3/2014 Sun et al.
8,682,572 B2 3/2014 Raz et al.
8,706,409 B2 4/2014 Mason et al.
8,774,752 B1 * 7/2014 Akcasu ................... H04W 4/12 455/466
8,831,825 B2 9/2014 Shah et al.
8,836,784 B2 9/2014 Erhardt et al.
8,838,331 B2 * 9/2014 Jensen ..................... G01N 9/36 702/23
8,918,229 B2 12/2014 Hunt et al.
8,953,228 B1 2/2015 Mehers
8,989,914 B1 3/2015 Nemat-Nasser et al.
8,989,959 B2 3/2015 Plante et al.
8,996,240 B2 3/2015 Plante
9,024,744 B2 5/2015 Klose et al.
9,053,590 B1 6/2015 Kator et al.
9,137,498 B1 9/2015 L'Heureux et al.
9,147,335 B2 9/2015 Raghunathan et al.
9,152,609 B2 10/2015 Schwartz et al.
9,165,196 B2 10/2015 Kesavan et al.
9,170,913 B2 10/2015 Hunt et al.
9,189,895 B2 11/2015 Phelan et al.
9,230,250 B1 1/2016 Parker et al.
9,230,437 B2 1/2016 Brinton et al.
9,280,435 B2 3/2016 Hunt et al.
9,311,271 B2 4/2016 Wright
9,344,683 B1 5/2016 Nemat-Nasser et al.
9,349,228 B2 5/2016 Ochsendorf et al.
9,384,111 B2 7/2016 Hunt et al.
9,389,147 B1 7/2016 Lambert et al.
9,402,060 B2 7/2016 Plante
9,412,282 B2 8/2016 Hunt et al.
9,439,280 B2 9/2016 Chang et al.
9,445,270 B1 9/2016 Bicket et al.
9,477,639 B2 10/2016 Fischer et al.
9,477,989 B2 10/2016 Grimm et al.
9,527,515 B2 12/2016 Hunt et al.
9,594,725 B1 3/2017 Cook et al.
9,672,667 B2 6/2017 Mason et al.
9,688,282 B2 6/2017 Cook et al.
9,728,015 B2 8/2017 Kwak
9,731,727 B2 8/2017 Heim et al.
9,761,063 B2 9/2017 Lambert et al.
9,761,067 B2 9/2017 Plante et al.
9,769,616 B1 * 9/2017 Pao ....................... H04W 4/023
9,805,595 B1 * 10/2017 Liebinger Portela .. G08G 1/087
9,811,536 B2 11/2017 Morris et al.
9,818,088 B2 11/2017 Penilla et al.
9,846,979 B1 12/2017 Sainaney et al.
9,849,834 B2 12/2017 Reed et al.
9,852,625 B2 12/2017 Victor et al.
9,892,376 B2 2/2018 Pfeiffer et al.
9,911,290 B1 3/2018 Zalewski et al.
9,922,567 B2 3/2018 Molin et al.
9,934,628 B2 4/2018 Kreiner et al.
9,952,046 B1 4/2018 Blacutt et al.
9,996,980 B1 6/2018 Gonzalez et al.
10,015,452 B1 7/2018 Schofield et al.
10,033,706 B2 7/2018 Bicket et al.
10,037,689 B2 * 7/2018 Taylor .................. G05D 1/0285
10,040,459 B1 8/2018 Kukreja
10,065,652 B2 9/2018 Shenoy et al.
10,068,392 B2 9/2018 Cook et al.
10,075,669 B2 9/2018 Vanman et al.
10,082,439 B1 * 9/2018 Helppi ................... B64D 45/00
10,083,547 B1 9/2018 Tomatsu
10,085,149 B2 9/2018 Bicket et al.
10,094,308 B2 10/2018 Kolhouse et al.
10,102,495 B1 10/2018 Zhang et al.
10,126,138 B1 * 11/2018 Farmer .............. G01C 21/3438
10,127,810 B2 11/2018 Durie, Jr. et al.
10,157,321 B2 12/2018 Becker et al.
10,173,486 B1 1/2019 Lee et al.
10,173,544 B2 1/2019 Hendrix et al.
10,196,071 B1 2/2019 Rowson et al.
10,206,107 B2 2/2019 Bicket et al.
10,223,935 B2 3/2019 Sweany et al.
10,234,368 B2 * 3/2019 Cherney .................. G01N 9/02
10,255,528 B1 4/2019 Nguyen
10,275,959 B2 4/2019 Ricci
10,286,875 B2 5/2019 Penilla et al.
10,290,036 B1 5/2019 Gella et al.

(56) References Cited

U.S. PATENT DOCUMENTS

| | | | |
|---|---|---|---|
| 10,311,749 B1 | 6/2019 | Kypri et al. | |
| 10,336,190 B2 | 7/2019 | Yokochi et al. | |
| 10,388,075 B2 | 8/2019 | Schmirler et al. | |
| 10,389,739 B2 | 8/2019 | Solotorevsky | |
| 10,390,227 B2 | 8/2019 | Bicket et al. | |
| 10,444,949 B2 | 10/2019 | Scott et al. | |
| 10,445,559 B2 | 10/2019 | Joseph et al. | |
| 10,459,444 B1 | 10/2019 | Kentley-Klay | |
| 10,460,183 B2 | 10/2019 | Welland et al. | |
| 10,460,600 B2 | 10/2019 | Julian et al. | |
| 10,471,955 B2 | 11/2019 | Kouri et al. | |
| 10,486,709 B1 | 11/2019 | Mezaael | |
| 10,489,222 B2 | 11/2019 | Sathyanarayana et al. | |
| 10,489,976 B2 * | 11/2019 | Jin | G08G 1/205 |
| 10,503,990 B2 | 12/2019 | Gleeson-May et al. | |
| 10,523,904 B2 | 12/2019 | Mahmoud et al. | |
| 10,573,183 B1 | 2/2020 | Li et al. | |
| 10,579,123 B2 | 3/2020 | Tuan et al. | |
| 10,609,114 B1 | 3/2020 | Bicket et al. | |
| 10,621,873 B1 | 4/2020 | Spiel et al. | |
| 10,623,899 B2 * | 4/2020 | Watkins | H04W 4/027 |
| 10,632,941 B2 | 4/2020 | Chauncey et al. | |
| 10,652,335 B2 | 5/2020 | Botticelli | |
| 10,715,976 B2 | 7/2020 | Hoffner et al. | |
| 10,762,363 B2 | 9/2020 | Watanabe | |
| 10,782,691 B2 | 9/2020 | Suresh et al. | |
| 10,788,990 B2 | 9/2020 | Kim et al. | |
| 10,789,840 B2 | 9/2020 | Boykin et al. | |
| 10,794,946 B2 | 10/2020 | Brooks et al. | |
| 10,803,496 B1 | 10/2020 | Hopkins | |
| 10,818,109 B2 | 10/2020 | Palmer et al. | |
| 10,827,324 B1 | 11/2020 | Hajimiri et al. | |
| 10,843,659 B1 | 11/2020 | Innocenzi et al. | |
| 10,848,670 B2 | 11/2020 | Gatti et al. | |
| 10,878,030 B1 | 12/2020 | Lambert et al. | |
| 10,969,852 B2 | 4/2021 | Tuan et al. | |
| 10,979,871 B2 | 4/2021 | Hajimiri et al. | |
| 10,999,269 B2 | 5/2021 | Bicket et al. | |
| 10,999,374 B2 * | 5/2021 | ElHattab | G07C 5/0841 |
| 11,046,205 B1 | 6/2021 | Govan et al. | |
| 11,069,257 B2 | 7/2021 | Palmer et al. | |
| 11,080,568 B2 | 8/2021 | ElHattab et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,131,986 B1 | 9/2021 | Gal et al. | |
| 11,132,853 B1 * | 9/2021 | Akhtar | G07C 5/12 |
| 11,137,744 B1 | 10/2021 | Heddleston et al. | |
| 11,142,175 B2 | 10/2021 | Chow et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,204,637 B2 | 12/2021 | Tuan et al. | |
| 11,260,878 B2 | 3/2022 | Palmer et al. | |
| 11,341,786 B1 | 5/2022 | Calmer et al. | |
| 11,349,901 B1 | 5/2022 | Duffield et al. | |
| 11,352,013 B1 | 6/2022 | Srinivasan et al. | |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,365,980 B1 | 6/2022 | Akhtar et al. | |
| 11,386,325 B1 | 7/2022 | Srinivasan et al. | |
| 11,436,844 B2 | 9/2022 | Carruthers et al. | |
| 11,451,610 B1 | 9/2022 | Saunders et al. | |
| 11,451,611 B1 | 9/2022 | Saunders et al. | |
| 11,460,507 B2 | 10/2022 | Lloyd et al. | |
| 11,464,079 B1 | 10/2022 | Aschenbener et al. | |
| 11,479,142 B1 | 10/2022 | Govan et al. | |
| 11,494,921 B2 | 11/2022 | ElHattab et al. | |
| 11,522,857 B1 | 12/2022 | Symons et al. | |
| 11,532,169 B1 | 12/2022 | Hassan et al. | |
| 11,558,449 B1 | 1/2023 | Bicket et al. | |
| 11,595,632 B2 | 2/2023 | Tsai et al. | |
| 11,599,097 B1 | 3/2023 | Gal et al. | |
| 11,606,736 B1 | 3/2023 | Lloyd et al. | |
| 11,611,621 B2 | 3/2023 | ElHattab et al. | |
| 11,615,141 B1 | 3/2023 | Hoye et al. | |
| 11,620,909 B2 | 4/2023 | Tsai et al. | |
| 11,627,252 B2 | 4/2023 | Delegard et al. | |
| 11,641,388 B1 | 5/2023 | Saunders et al. | |
| 11,641,604 B1 | 5/2023 | Lloyd | |
| 11,643,102 B1 | 5/2023 | Calmer et al. | |
| 11,659,060 B2 | 5/2023 | Davis et al. | |
| 11,665,223 B1 | 5/2023 | Duffield et al. | |
| 11,669,714 B1 | 6/2023 | Akhtar et al. | |
| 11,671,478 B1 | 6/2023 | Saunders et al. | |
| 11,674,813 B1 | 6/2023 | Chung et al. | |
| 11,675,042 B1 | 6/2023 | Lloyd et al. | |
| 11,683,579 B1 | 6/2023 | Symons et al. | |
| 11,688,211 B1 | 6/2023 | Calmer et al. | |
| 11,694,317 B1 | 7/2023 | Jain et al. | |
| 11,704,984 B1 | 7/2023 | ElHattab et al. | |
| 11,709,500 B2 | 7/2023 | Lloyd et al. | |
| 11,710,409 B2 | 7/2023 | Nanda et al. | |
| 11,720,087 B1 | 8/2023 | Heddleston et al. | |
| 11,727,054 B2 | 8/2023 | Grandhi et al. | |
| 11,731,469 B1 | 8/2023 | McGillan | |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,752,895 B1 | 9/2023 | Govan et al. | |
| 11,756,346 B1 | 9/2023 | Wu et al. | |
| 11,756,351 B1 | 9/2023 | Akhtar et al. | |
| 11,758,096 B2 | 9/2023 | Shah et al. | |
| 11,776,328 B2 | 10/2023 | Yang et al. | |
| 11,780,446 B1 | 10/2023 | Srinivasan et al. | |
| 11,782,930 B2 | 10/2023 | McGee et al. | |
| 11,787,413 B2 | 10/2023 | Tsai et al. | |
| 11,798,187 B2 | 10/2023 | Zaheer et al. | |
| 11,798,298 B2 | 10/2023 | Hassan et al. | |
| 11,800,317 B1 | 10/2023 | Dugar et al. | |
| 11,838,884 B1 | 12/2023 | Dergosits et al. | |
| 11,842,577 B1 | 12/2023 | Harrison et al. | |
| 11,847,911 B2 | 12/2023 | ElHattab et al. | |
| 11,855,801 B1 | 12/2023 | Stevenson et al. | |
| 11,861,955 B1 | 1/2024 | Dubin et al. | |
| 11,863,712 B1 | 1/2024 | Young et al. | |
| 11,866,055 B1 | 1/2024 | Srinivasan et al. | |
| 11,868,919 B1 | 1/2024 | Zhang et al. | |
| 11,875,580 B2 | 1/2024 | Hassan et al. | |
| 11,875,683 B1 | 1/2024 | Tsai et al. | |
| 11,890,962 B1 | 2/2024 | Govan et al. | |
| 11,937,152 B2 | 3/2024 | Hajimiri et al. | |
| 11,938,948 B1 | 3/2024 | Davis et al. | |
| 11,959,772 B2 | 4/2024 | Robbins et al. | |
| 11,974,410 B1 | 4/2024 | Lin et al. | |
| 11,975,685 B1 | 5/2024 | Innocenzi et al. | |
| 11,989,001 B1 | 5/2024 | ElHattab et al. | |
| 11,995,546 B1 | 5/2024 | Srinivasan et al. | |
| 11,997,181 B1 | 5/2024 | Davis et al. | |
| 12,000,940 B1 | 6/2024 | Lloyd et al. | |
| 2002/0061758 A1 | 5/2002 | Zarlengo et al. | |
| 2002/0093565 A1 * | 7/2002 | Watkins | B64D 47/08 348/148 |
| 2002/0128751 A1 | 9/2002 | Engstrom et al. | |
| 2002/0169850 A1 | 11/2002 | Batke et al. | |
| 2003/0081935 A1 | 5/2003 | Kirmuss | |
| 2003/0154009 A1 | 8/2003 | Basir et al. | |
| 2004/0093264 A1 | 5/2004 | Shimizu | |
| 2004/0236476 A1 | 11/2004 | Chowdhary | |
| 2004/0236596 A1 | 11/2004 | Chowdhary et al. | |
| 2005/0051666 A1 * | 3/2005 | Lee | B64C 17/10 244/10 |
| 2005/0131585 A1 | 6/2005 | Luskin et al. | |
| 2005/0131646 A1 | 6/2005 | Camus | |
| 2005/0286774 A1 | 12/2005 | Porikli | |
| 2006/0167591 A1 | 7/2006 | McNally | |
| 2007/0050108 A1 | 3/2007 | Larschan et al. | |
| 2007/0080816 A1 | 4/2007 | Haque et al. | |
| 2007/0173991 A1 | 7/2007 | Tenzer et al. | |
| 2008/0252412 A1 | 10/2008 | Larsson et al. | |
| 2008/0252487 A1 | 10/2008 | Mcclellan et al. | |
| 2008/0319602 A1 | 12/2008 | McClellan et al. | |

(56) References Cited

U.S. PATENT DOCUMENTS

| | | | | |
|---|---|---|---|---|
| 2009/0034801 | A1 | 2/2009 | Hammoud | |
| 2009/0062993 | A1* | 3/2009 | Morey | E02F 3/651 701/50 |
| 2009/0088961 | A1* | 4/2009 | Morey | G01G 19/10 701/472 |
| 2009/0099724 | A1 | 4/2009 | Kranz et al. | |
| 2009/0141939 | A1 | 6/2009 | Chambers et al. | |
| 2009/0240427 | A1 | 9/2009 | Siereveld et al. | |
| 2010/0030586 | A1 | 2/2010 | Taylor et al. | |
| 2010/0049639 | A1 | 2/2010 | Ferro et al. | |
| 2010/0163670 | A1* | 7/2010 | Dizdarevic | B64C 3/10 244/36 |
| 2010/0203901 | A1 | 8/2010 | Dinoff et al. | |
| 2010/0281161 | A1 | 11/2010 | Cohn et al. | |
| 2011/0060496 | A1 | 3/2011 | Nielsen et al. | |
| 2011/0093306 | A1 | 4/2011 | Nielsen et al. | |
| 2011/0234749 | A1 | 9/2011 | Alon | |
| 2011/0276265 | A1 | 11/2011 | Husain | |
| 2012/0076437 | A1* | 3/2012 | King | G06Q 40/08 382/286 |
| 2012/0109418 | A1 | 5/2012 | Lorber | |
| 2012/0136542 | A1* | 5/2012 | Upcroft | E02F 3/48 701/50 |
| 2012/0194357 | A1 | 8/2012 | Ciolli | |
| 2012/0201277 | A1 | 8/2012 | Tanner et al. | |
| 2012/0218416 | A1 | 8/2012 | Leny et al. | |
| 2012/0235625 | A1 | 9/2012 | Takehara | |
| 2012/0262104 | A1 | 10/2012 | Kirsch | |
| 2012/0303397 | A1 | 11/2012 | Prosser | |
| 2013/0073112 | A1 | 3/2013 | Phelan et al. | |
| 2013/0073114 | A1 | 3/2013 | Nemat-Nasser et al. | |
| 2013/0162421 | A1 | 6/2013 | Inaguma et al. | |
| 2013/0162425 | A1 | 6/2013 | Raghunathan et al. | |
| 2013/0164713 | A1 | 6/2013 | Hunt et al. | |
| 2013/0211559 | A1 | 8/2013 | Lawson et al. | |
| 2013/0212130 | A1 | 8/2013 | Rahnama | |
| 2013/0244210 | A1 | 9/2013 | Nath et al. | |
| 2013/0250040 | A1 | 9/2013 | Vitsnudel et al. | |
| 2013/0332004 | A1 | 12/2013 | Gompert et al. | |
| 2014/0012492 | A1 | 1/2014 | Bowers et al. | |
| 2014/0095061 | A1 | 4/2014 | Hyde | |
| 2014/0098060 | A1 | 4/2014 | McQuade et al. | |
| 2014/0113619 | A1 | 4/2014 | Tibbitts et al. | |
| 2014/0159660 | A1 | 6/2014 | Klose et al. | |
| 2014/0193781 | A1 | 7/2014 | Sands | |
| 2014/0195106 | A1 | 7/2014 | McQuade et al. | |
| 2014/0195477 | A1 | 7/2014 | Graumann et al. | |
| 2014/0223090 | A1 | 8/2014 | Malone | |
| 2014/0249700 | A1* | 9/2014 | Elias | B64D 31/00 701/14 |
| 2014/0278108 | A1 | 9/2014 | Kerrigan et al. | |
| 2014/0293069 | A1 | 10/2014 | Lazar et al. | |
| 2014/0324281 | A1 | 10/2014 | Nemat-Nasser et al. | |
| 2014/0328517 | A1 | 11/2014 | Gluncic | |
| 2014/0337429 | A1 | 11/2014 | Asenjo et al. | |
| 2014/0354227 | A1 | 12/2014 | Tyagi et al. | |
| 2014/0354228 | A1 | 12/2014 | Williams et al. | |
| 2014/0376876 | A1* | 12/2014 | Bentley | G06V 40/23 386/227 |
| 2015/0024705 | A1* | 1/2015 | Rashidi | H04N 5/77 455/404.2 |
| 2015/0025734 | A1 | 1/2015 | Cook et al. | |
| 2015/0035665 | A1* | 2/2015 | Plante | B60K 35/00 340/438 |
| 2015/0044641 | A1 | 2/2015 | Chauncey et al. | |
| 2015/0074091 | A1 | 3/2015 | Walkin et al. | |
| 2015/0084757 | A1* | 3/2015 | Annibale | H04W 4/90 340/436 |
| 2015/0116114 | A1* | 4/2015 | Boyles | G08B 25/00 340/539.17 |
| 2015/0175168 | A1* | 6/2015 | Hoye | B60W 40/08 434/64 |
| 2015/0226563 | A1 | 8/2015 | Cox et al. | |
| 2015/0283912 | A1 | 10/2015 | Shimizu et al. | |
| 2015/0347121 | A1 | 12/2015 | Harumoto | |
| 2016/0034770 | A1 | 2/2016 | Peterson et al. | |
| 2016/0046290 | A1* | 2/2016 | Aharony | B60W 10/20 701/41 |
| 2016/0046298 | A1 | 2/2016 | DeRuyck et al. | |
| 2016/0110066 | A1 | 4/2016 | McCormick et al. | |
| 2016/0176401 | A1 | 6/2016 | Pilkington | |
| 2016/0267335 | A1 | 9/2016 | Hampiholi | |
| 2016/0275376 | A1 | 9/2016 | Kant | |
| 2016/0288744 | A1 | 10/2016 | Rutherford et al. | |
| 2016/0293049 | A1 | 10/2016 | Monahan et al. | |
| 2016/0343091 | A1 | 11/2016 | Han et al. | |
| 2016/0364678 | A1* | 12/2016 | Cao | G06Q 10/083 |
| 2016/0364812 | A1* | 12/2016 | Cao | G06Q 50/01 |
| 2016/0375780 | A1 | 12/2016 | Penilla et al. | |
| 2017/0039784 | A1 | 2/2017 | Gelbart et al. | |
| 2017/0053555 | A1 | 2/2017 | Angel et al. | |
| 2017/0055868 | A1 | 3/2017 | Hatakeyama | |
| 2017/0060726 | A1 | 3/2017 | Glistvain | |
| 2017/0061222 | A1 | 3/2017 | Hoye et al. | |
| 2017/0088142 | A1 | 3/2017 | Hunt et al. | |
| 2017/0102463 | A1 | 4/2017 | Hwang | |
| 2017/0113664 | A1 | 4/2017 | Nix | |
| 2017/0123397 | A1 | 5/2017 | Billi et al. | |
| 2017/0124476 | A1 | 5/2017 | Levinson et al. | |
| 2017/0140603 | A1 | 5/2017 | Ricci | |
| 2017/0195265 | A1 | 7/2017 | Billi et al. | |
| 2017/0200061 | A1 | 7/2017 | Julian et al. | |
| 2017/0217444 | A1 | 8/2017 | Chaston et al. | |
| 2017/0263049 | A1 | 9/2017 | MacDonald et al. | |
| 2017/0263120 | A1 | 9/2017 | Durie, Jr. et al. | |
| 2017/0278004 | A1 | 9/2017 | McElhinney et al. | |
| 2017/0286838 | A1 | 10/2017 | Cipriani et al. | |
| 2017/0291611 | A1 | 10/2017 | Innes et al. | |
| 2017/0291800 | A1 | 10/2017 | Scoville et al. | |
| 2017/0292848 | A1 | 10/2017 | Nepomuceno et al. | |
| 2017/0323641 | A1 | 11/2017 | Shimizu et al. | |
| 2017/0332199 | A1 | 11/2017 | Elliott et al. | |
| 2017/0344010 | A1* | 11/2017 | Rander | B60W 30/00 |
| 2017/0345283 | A1 | 11/2017 | Kwon et al. | |
| 2017/0365030 | A1* | 12/2017 | Shoham | G08G 1/207 |
| 2017/0366935 | A1 | 12/2017 | Ahmadzadeh et al. | |
| 2018/0001771 | A1 | 1/2018 | Park et al. | |
| 2018/0001899 | A1 | 1/2018 | Shenoy et al. | |
| 2018/0012196 | A1 | 1/2018 | Ricci et al. | |
| 2018/0025636 | A1* | 1/2018 | Boykin | G08G 1/096725 701/1 |
| 2018/0033296 | A1* | 2/2018 | Fowe | G01C 21/3691 |
| 2018/0039862 | A1 | 2/2018 | Hyatt et al. | |
| 2018/0039917 | A1* | 2/2018 | Buttolo | G06Q 10/109 |
| 2018/0048850 | A1 | 2/2018 | Bostick et al. | |
| 2018/0063576 | A1 | 3/2018 | Tillman et al. | |
| 2018/0068206 | A1 | 3/2018 | Pollach et al. | |
| 2018/0072313 | A1 | 3/2018 | Stenneth | |
| 2018/0075309 | A1 | 3/2018 | Sathyanarayana et al. | |
| 2018/0090001 | A1* | 3/2018 | Fletcher | G08G 1/096725 |
| 2018/0093672 | A1 | 4/2018 | Terwilliger et al. | |
| 2018/0126901 | A1 | 5/2018 | Levkova et al. | |
| 2018/0162546 | A1* | 6/2018 | Gowda | G06F 3/0482 |
| 2018/0174485 | A1 | 6/2018 | Stankoulov | |
| 2018/0189913 | A1* | 7/2018 | Knopp | H04W 4/021 |
| 2018/0209866 | A1* | 7/2018 | Gonnsen | G06F 30/15 |
| 2018/0211541 | A1* | 7/2018 | Rakah | G08G 1/0129 |
| 2018/0216315 | A1* | 8/2018 | Benson | E02F 3/844 |
| 2018/0232583 | A1 | 8/2018 | Wang et al. | |
| 2018/0234514 | A1 | 8/2018 | Rajiv et al. | |
| 2018/0247109 | A1 | 8/2018 | Joseph et al. | |
| 2018/0253109 | A1 | 9/2018 | Fontaine et al. | |
| 2018/0259353 | A1 | 9/2018 | Tsurumi et al. | |
| 2018/0262724 | A1 | 9/2018 | Ross | |
| 2018/0276485 | A1 | 9/2018 | Heck et al. | |
| 2018/0281815 | A1* | 10/2018 | Stentz | G01C 21/3407 |
| 2018/0288182 | A1 | 10/2018 | Tong et al. | |
| 2018/0295141 | A1 | 10/2018 | Solotorevsky | |
| 2018/0329381 | A1 | 11/2018 | Doh et al. | |
| 2018/0341706 | A1* | 11/2018 | Agrawal | G06V 20/48 |
| 2018/0356800 | A1 | 12/2018 | Chao et al. | |
| 2018/0357484 | A1 | 12/2018 | Omata | |
| 2018/0364686 | A1 | 12/2018 | Naidoo et al. | |

(56) References Cited

U.S. PATENT DOCUMENTS

| | | | |
|---|---|---|---|
| 2018/0365888 | A1 | 12/2018 | Satzoda et al. |
| 2019/0003848 | A1 | 1/2019 | Hoten et al. |
| 2019/0007690 | A1 | 1/2019 | Varadarajan et al. |
| 2019/0019068 | A1 | 1/2019 | Zhu et al. |
| 2019/0023208 | A1 | 1/2019 | Boston et al. |
| 2019/0050657 | A1 | 2/2019 | Gleeson-May et al. |
| 2019/0054876 | A1 | 2/2019 | Ferguson et al. |
| 2019/0065951 | A1 | 2/2019 | Luo et al. |
| 2019/0077308 | A1 | 3/2019 | Kashchenko |
| 2019/0118655 | A1 | 4/2019 | Grimes et al. |
| 2019/0120947 | A1 | 4/2019 | Wheeler et al. |
| 2019/0127078 | A1* | 5/2019 | Kim ........................ B64D 43/00 |
| 2019/0174158 | A1 | 6/2019 | Herrick et al. |
| 2019/0188847 | A1 | 6/2019 | Gonzalez et al. |
| 2019/0244301 | A1* | 8/2019 | Seth ........................ G06F 16/73 |
| 2019/0257661 | A1 | 8/2019 | Stentz et al. |
| 2019/0265712 | A1 | 8/2019 | Satzoda et al. |
| 2019/0272725 | A1 | 9/2019 | Viklund et al. |
| 2019/0286948 | A1 | 9/2019 | Sathyanarayana et al. |
| 2019/0303718 | A1 | 10/2019 | Tanigawa et al. |
| 2019/0304082 | A1 | 10/2019 | Tokashiki et al. |
| 2019/0318419 | A1 | 10/2019 | VanderZanden |
| 2019/0318549 | A1 | 10/2019 | Zeira et al. |
| 2019/0327590 | A1 | 10/2019 | Kubo et al. |
| 2019/0327613 | A1 | 10/2019 | Bicket et al. |
| 2019/0370577 | A1 | 12/2019 | Meng et al. |
| 2019/0370581 | A1 | 12/2019 | Cordell et al. |
| 2020/0018612 | A1 | 1/2020 | Wolcott |
| 2020/0026282 | A1 | 1/2020 | Choe et al. |
| 2020/0050182 | A1 | 2/2020 | Cheng et al. |
| 2020/0074326 | A1 | 3/2020 | Balakrishnan et al. |
| 2020/0074397 | A1 | 3/2020 | Burda et al. |
| 2020/0077892 | A1* | 3/2020 | Tran ...................... A61B 5/1117 |
| 2020/0086879 | A1 | 3/2020 | Lakshmi Narayanan et al. |
| 2020/0139847 | A1 | 5/2020 | Baumer et al. |
| 2020/0150739 | A1 | 5/2020 | Tuan et al. |
| 2020/0162489 | A1* | 5/2020 | Bar-Nahum ........... G06N 20/00 |
| 2020/0164509 | A1 | 5/2020 | Shults et al. |
| 2020/0166401 | A1* | 5/2020 | Reabe .................... G01G 19/12 |
| 2020/0168094 | A1 | 5/2020 | Shimodaira et al. |
| 2020/0192355 | A1* | 6/2020 | Lu .......................... G08G 1/163 |
| 2020/0207358 | A1 | 7/2020 | Katz et al. |
| 2020/0238952 | A1 | 7/2020 | Lindsay et al. |
| 2020/0283003 | A1 | 9/2020 | Raichelgauz |
| 2020/0290742 | A1* | 9/2020 | Kumar ................... B64D 27/24 |
| 2020/0294220 | A1 | 9/2020 | Gonzalez Diaz et al. |
| 2020/0311602 | A1 | 10/2020 | Hawley et al. |
| 2020/0312063 | A1 | 10/2020 | Balakrishnan et al. |
| 2020/0312155 | A1 | 10/2020 | Kelkar et al. |
| 2020/0327009 | A1 | 10/2020 | Callison et al. |
| 2020/0327345 | A1 | 10/2020 | Schumacher et al. |
| 2020/0327369 | A1 | 10/2020 | Cruz et al. |
| 2020/0342230 | A1 | 10/2020 | Tsai et al. |
| 2020/0342235 | A1 | 10/2020 | Tsai et al. |
| 2020/0342274 | A1* | 10/2020 | ElHattab .................. B60Q 9/00 |
| 2020/0342506 | A1 | 10/2020 | Levy et al. |
| 2020/0342611 | A1* | 10/2020 | ElHattab ................... G06T 7/90 |
| 2020/0344301 | A1* | 10/2020 | ElHattab ................ G06V 20/56 |
| 2020/0371773 | A1 | 11/2020 | Kato et al. |
| 2020/0380806 | A1 | 12/2020 | Tabata |
| 2020/0389415 | A1 | 12/2020 | Zhao et al. |
| 2021/0006950 | A1 | 1/2021 | Hajimiri et al. |
| 2021/0073626 | A1 | 3/2021 | Brahma et al. |
| 2021/0097315 | A1 | 4/2021 | Carruthers et al. |
| 2021/0104159 | A1 | 4/2021 | Tsai et al. |
| 2021/0201666 | A1 | 7/2021 | Pelleg et al. |
| 2021/0245749 | A1 | 8/2021 | Ross et al. |
| 2021/0279475 | A1 | 9/2021 | Tusch et al. |
| 2021/0287066 | A1 | 9/2021 | Xie et al. |
| 2021/0337460 | A1 | 10/2021 | Breaux, III et al. |
| 2021/0394775 | A1 | 12/2021 | Julian et al. |
| 2021/0397908 | A1 | 12/2021 | ElHattab et al. |
| 2021/0403004 | A1 | 12/2021 | Alvarez et al. |
| 2022/0005332 | A1 | 1/2022 | Metzler et al. |
| 2022/0165073 | A1 | 5/2022 | Shikii et al. |
| 2022/0289203 | A1 | 9/2022 | Makilya et al. |
| 2022/0374737 | A1 | 11/2022 | Dhara et al. |
| 2023/0077207 | A1 | 3/2023 | Hassan et al. |
| 2023/0153735 | A1 | 5/2023 | Dhara et al. |
| 2023/0169420 | A1 | 6/2023 | Dhara et al. |
| 2023/0219592 | A1 | 7/2023 | Calmer et al. |
| 2023/0281553 | A1 | 9/2023 | Singh et al. |
| 2024/0003749 | A1 | 1/2024 | Lin et al. |
| 2024/0005678 | A1 | 1/2024 | Hassan et al. |
| 2024/0013423 | A1 | 1/2024 | Zaheer et al. |
| 2024/0063596 | A1 | 2/2024 | Pandian et al. |
| 2024/0146629 | A1 | 5/2024 | Lloyd |

FOREIGN PATENT DOCUMENTS

| | | | |
|---|---|---|---|
| CN | 111047179 | A | 4/2020 |
| DE | 10 2004 015 221 | A1 | 10/2005 |
| EP | 1615178 | A2 | 1/2006 |
| GB | 2288892 | A | 11/1995 |
| KR | 102324978 | B1 | 11/2021 |
| WO | WO 2017/123665 | A1 | 7/2017 |
| WO | WO 2018/131322 | A1 | 7/2018 |
| WO | WO 2019/099409 | A1 | 5/2019 |
| WO | WO 2019/125545 | A1 | 6/2019 |
| WO | WO 2019/133533 | A1 | 7/2019 |
| WO | WO 2023/244513 | A1 | 12/2023 |

OTHER PUBLICATIONS

U.S. Appl. No. 18/188,173, Dash Cam with Artificial Intelligence Safety Event Detection, filed Mar. 22, 2023.

U.S. Appl. No. 17/662,622, Tuning Layers of a Modular Neural Network, filed May 9, 2022.

U.S. Appl. No. 17/811,512, An Ensemble Neural Network State Machine for Detecting Distractions, filed Jul. 8, 2022.

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAIaIQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Front-Facing AI Dash Cam—CM31", Samsara Inc., accessed Feb. 7, 2024 [publication date unknown]. URL: https://www.samsara.

(56) References Cited

OTHER PUBLICATIONS com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Guide: Drive risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.
"KeepTruckin Expands Hardware Portfolio to Support Fleet Safety and Efficiencyy—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"Keep Truckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Map and Tile Coordinates", Google for Developers, last updated Oct. 23, 2023 [retrieved on Oct. 24, 2023], in 5 pages. URL: https://developers.google.com/maps/documentation/javascript/coordinates.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/(filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.
"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_1203118185166511 (referenced in Jan. 21, 2024 Complaint, Case No. 1:24-cv-00084-UNA), in 3 pages. URL: https://gomotive.com/content-library/guides/system-overview/.
"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.
"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.
"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.
"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: AI Dashcam", Motive Technologies, Inc., [publication date unknown], Document No. 2023Q2_1205736073289732 (referenced in Jan. 21, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_ 1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 21, 2024Complaint, Case No. 1:24-cv-00084-UNA), in 6 pages. URL: https://gomotive.com/content-library/spec-sheet/vehicle-gateway/.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_truckin g_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.
Brown, P. et al., "AI Dash Cam Benchmarking" [report], Strategy Analytics, Inc., Apr. 15, 2022, in 27 pages.
Camden, M. et al., "AI Dash Cam Performance Benchmark Testing Final Report", Virginia Tech Transportation Institute, revised Aug. 17, 2023 [submitted Jun. 30, 2023] (filed with Jan. 21, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 21, 2024 Complaint, Case No. 1:24-cv-00084-UNA), in 109 pages.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

(56) References Cited

OTHER PUBLICATIONS

Green, A., "Logistics Disruptors: Motive's Shoaib Makani on AI and automation", Mckinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Khan, M., "Why and How We Measure Driver Performance", Medium, Jan. 14, 2020. URL: https://medium.com/motive-eng/why-and-how-we-measure-driver-performance-768d5316fb2c# :~: text= By%20studying%20data%20gathered%20from, the%20driver%20a%20safety%2 Oscore (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-US/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-US/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-US/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-US/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-US/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-US/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-US/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-US/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-US/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-US/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-US/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-US/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-US/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-US/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-US/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-US/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-US/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-US/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-US/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-US/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-US/articles/6189410468509-How-to-view-a-Safety-Event.
Motive Help Center, "How to view Fleet Drive Score Report on Fleet Dashboard", Motive Technologies, Inc., accessed on Feb. 7, 2024 [publication date unknown]. URL: https://helpcenter.gomotive.com/hc/en-US/articles/13200798670493-How-to-view-Fleet-DRIVE-Score- Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Fuel Hub Driver Details", Motive Technologies, Inc., [publication date unknown]. URL: https://helpcenter.gomotive.com/hc/en-US/articles/6173246145053-How-

(56) References Cited

OTHER PUBLICATIONS to-view-Fuel- Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-US/articles/6173246145053-How-to-view-Fuel-Hub-Driver-Details.
Motive Help Center, "How to view Group Drive Score Report on Fleet Dashboard", Motive Technologies, Inc., accessed on Feb. 7, 2024 [publication date unknown]. URL: https://helpcenter.gomotive.com/hc/en-US/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view safety events report", Motive Technologies, Inc., accessed on Oct. 24, 2023 [publication date unknown], in 2 pages. URL: https://helpcenter.gomotive.com/hc/en-US/articles/6190647741853-How-to-view-safety-events-report.
Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-US/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-US/articles/6163732277917-How-to-view-Stop-Sign-Violation-events-on-Fleet-Dashboard.
Motive Help Center, "How to view the Driver Drive Score Report", Motive Technologies, Inc., accessed on Feb. 7, 2024 [publication date unknown]. URL: https://helpcenter.gomotive.com/hc/en-US/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view the Safety Hub and Drive Score details in the DriverApp", Motive Technologies, Inc., accessed on Oct. 24, 2023 [publication date unknown], in 5 pages. URL: https://helpcenter.gomotive.com/hc/en-US/articles/6162215453853-How-to-view-safety-events-and-Dashcam-videos-on-Motive-App.
Motive Help Center, "How to view your vehicle's Utilization details", Motive Technologies, Inc., accessed on Feb. 7, 2024 [publication date unknown]. URL: https://helpcenter.gomotive.com/hc/en-US/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-US/articles/6189574616989-Viewing-Close-Following-Events-on-the-Motive-Fleet-Dashboard.
Motive Help Center, "What are Alert Types?", Motive Technologies, Inc., accessed on Oct. 24, 2023 [publication date unknown], in 3 pages. URL: https://helpcenter.gomotive.com/hc/en-US/articles/8239240188957-What-are-Alert-Types-.
Motive Help Center, "What are Environmental Sensors?", Motive Technologies, Inc., accessed on Oct. 24, 2023 [publication date unknown], in 4 pages. URL: https://helpcenter.gomotive.com/hc/en-US/articles/6907551525661-What-are-Environmental-Sensors-.
Motive Help Center, "What are safety risk tags?", Motive Technologies, Inc., accessed on Feb. 21, 2024 [publication date unknown], in 4 pages. URL: https://helpcenter.gomotive.com/hc/en-US/articles/6163713841053.
Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-US/articles/8218103926941-What-are-the-definitions-of-safety-behaviors-triggered-by-Motive-s-AI-Smart-Dashcams.
Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-US/articles/8218103926941-What-are-the-definitions-of-safety-behaviors-triggered-by-Motive-s-AI-Smart-Dashcams.
Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-US/articles/6858636962333-What-are-unsafe-behaviors-.
Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-US/articles/6160848958109-What-are-Vehicle-Gateway-Malfunctions-and-Data-Diagnostics.
Motive Help Center, "What is Drive Risk Score?", Motive Technologies, Inc., accessed on Oct. 24, 2023 [publication date unknown], in 5 pages. URL: https://helpcenter.gomotive.com/hc/en-US/articles/6162164321693-What-is-Drive-risk-score-.
Motive Help Center, "What is Dtive Risk Score?", Motive Technologies, Inc., accessed on Oct. 24, 2023 [publication date unknown]. URL: https://helpcenter.gomotive.com/hc/en-US/articles/6162164321693-What-is-DRIVE-risk-score-(filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "What is Event Severity?", Motive Technologies, Inc., accessed on Oct. 24, 2023 [publication date unknown], in 3 pages. URL: https://helpcenter.gomotive.com/hc/en-US/articles/6176003080861-What-is-Event-Severity-.
Motive Help Center, "What is Fuel Hub?", Motive Technologies, Inc., accessed on Feb. 5, 2024 [publication date unknown]. URL: https://helpcenter.gomotive.com/hc/en/US/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive Help Center, "What is Fuel Hub?", Motive Technologies, Inc., accessed on Oct. 24, 2023 [[publication date unknown], in 9 pages. URL: https://helpcenter.gomotive.com/hc/en-US/articles/6161577899165-What-is-Fuel-Hub-.
Motive Help Center, "What is Motive Fleet App?", Motive Technologies, Inc., accessed on Oct. 24, 2023 [publication date unknown], in 12 pages. URL: https://helpcenter.gomotive.com/hc/en-US/articles/6113996661917-What-is-Motive-Fleet-App-.
Motive Help Center, "What is Safety Hub?", Motive Technologies, Inc., accessed on Oct. 24, 2023 [publication date unknown], in 10 pages. URL: https://helpcenter.gomotive.com/hc/en-US/articles/6162472353053-What-is-Safety-Hub-.
Motive Help Center, "What Motive fuel features are available?", Motive Technologies, Inc., accessed on Oct. 24, 2023 [publication date unknown], in 2 pages. URL: https://helpcenter.gomotive.com/hc/en-US/articles/6189158796445-What-Motive-fuel-features-are-available-.
Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-US/articles/6858636962333-What-unsafe-behaviors-does-Motive-monitor-through-Dashcam-and-Vehicle-Gateway-#01HCB72T2EXXW3FFVJ1XSDEG77.

(56) References Cited

OTHER PUBLICATIONS

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en/US/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www.youtube.com/watch?v=jifKM3GT6Bs.

Motive, "Benchmarking AI Accuracy for Driver Safety" [video], YouTube, Apr. 21, 2022, screenshot in 1 page. URL: https://www.youtube.com/watch?v=brRt2h0J80E.

Motive, "CEO Shoaib Makani's email to Motive employees.", Motive Technologies, Inc., Dec. 7, 2022, in 5 pages. URL: https://gomotive.com/blog/shoaib-makanis-message-to-employees/.

Motive, "Coach your drivers using the Motive Safety Hub." [video], YouTube, Mar. 27, 2023, screenshot in 1 page. URL: https://www.youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.

Motive, "Guide: AI Model Development", Motive Technologies, Inc., accessed on Mar. 29, 2024 [publication date unknown], Document No. 2022Q1_849898994, in 14 pages.

Motive, "Guide: Drive risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WnclRs_cFw0.

Motive, "How to install your Motive AI Dashcam." [video], YouTube, Aug. 5, 2022, screenshot in 1 page. URL: https://www.youtube.com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive.com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https://gomotive.com/blog/introducing-easier-ude-management/.

Motive, "Introducing Motive Driver Workflow.", Motive Technologies, Inc., Oct. 16, 2017, in 5 pages. URL: https://gomotive.com/blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies,https://gomotive.com/blog/announcing-smart-dashcam (filed withMatter of Certain Vehicle Telematics, Fleet Management, and Video-Basedand Components thereof, Investigation No. 337-TA-3722), in 9 pages.

Motive, "KeepTruckin ELD Training for Drivers" [video], YouTube, Feb. 2, 2018, screenshot in 1 page. URL: https://www.youtube.com/watch?v=LKJLIT2bGS0.

Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www.youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No. time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_ 1202933457877590, in 4 pages.

Motive, "Products | AI Dashcam - Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet

(56) References Cited

OTHER PUBLICATIONS

Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j61.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/US-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Samsara Support, "AI Event Detection", Samsara Inc., accessed on Feb. 7, 2024 [publication date unknown]. URL: https://kb.samsara.com/hc/en-US/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-US/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-US/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-US/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-US/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-US/articles/360042037572-Dash-Cam- Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-US/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-US/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-US/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle

(56) References Cited

OTHER PUBLICATIONS

Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways - VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
U.S. Appl. No. 18/649,678, Dynamic Delivery of Vehicle Event Data, filed Apr. 29, 2024.
U.S. Appl. No. 18/188,173, Dash Cam with Artifical Intelligence Safety Event Detection, filed Mar. 22, 2023.
U.S. Appl. No. 18/448,760, Refining Event Triggers Using Machine Learning Model Feedback, filed Aug. 11, 2023.
U.S. Appl. No. 17/811,512, An Ensemble Neural Network State Machine For Detecting Distractions, filed Apr. 23, 2024.
Batchelor, B. et al., "Vision Systems on the Internet", Proc. SPIE 6000, Two-and Three-Dimensional Methods for Inspection and Metrology III, Nov. 2005, vol. 600003, in 15 pages.
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cordes, C., "Ask an Expert: Capturing Fleet Impact from Telematics", Mckinsey & Co., Jun. 13, 2017, in 3 pages. URL: https://www.mckinsey.com/capabilities/operations/our-insights/ask-an-expert-capturing-fleet-impact-from-telematics.
D'Agostino, C. et al., "Learning-Based Driving Events Recognition and Its Application to Digital Roads", IEEE Transactions on Intelligent Transportation Systems, Aug. 2015, vol. 16(4), pp. 2155-2166.
Dillon, A., "User Interface Design", MacMillan Encyclopedia of Cognitive Science, 2003, vol. 4, London: MacMillan, in 17 p. (pp. 453-458). Downloaded from http://hdl.handle.net/10150/105299.
Dillon, A., "User Interface Design", MacMillan Encyclopedia of Cognitive Science, 2006, vol. 4, London: MacMillan, in 6 p. (pp. 453-458). Downloaded from https://onlinelibrary.wiley.com/doi/10.1002/0470018860.s00054.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Gilman, E. et al., "Personalised assistance for fuel-efficient driving", Transportation Research Part C, Mar. 2015, pp. 681-705.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Groover, M. P., "Chapter 22 Inspection Technologies", in Automation, Production Systems, and Computer-Integrated Manufacturing, 2015, 4th Edition, Pearson, pp. 647-684.
Groover, M. P., *Automation, Production Systems, and Computer-Integrated Manufacturing*, 2016, 4th Edition (Indian Subcontinent Adaptation), Pearson, in 11 pages.
Han, Z. et al., "Design of Intelligent Road Recognition and Warning System for Vehicles Based on Binocular Vision", IEEE Access, Oct. 2018, vol. 6, pp. 62880-62889.
Haworth, N. et al., "The Relationship between Fuel Economy and Safety Outcomes", Monash University, Accident Research Centre, Dec. 2001, Report No. 188, in 67 pages.
Huang, K.-Y. et al., "A Novel Machine Vision System for the Inspection of Micro-Spray Nozzle", Sensors, Jun. 2015, vol. 15(7), pp. 15326-15338.
Junior, J. F. et al., "Driver behavior profiling: An investigation with different smartphone sensors and machine learning", PLoS One, Apr. 2017, vol. 12(4): e0174959, in 16 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lotan, T. et al., "In-Vehicle Data Recorder for Evaluation of Driving Behavior and Safety", Transportation Research Record Journal of the Transportation Research Board, Jan. 2006, in 15 pages.
Malamas, Elias N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Perez, L. et al., "Robot Guidance Using Machine Vision Techniques in Industrial Environments: A Comparative Review", Sensors, Mar. 2016, vol. 16(3), in 27 pages.
Ramkumar, S. M et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages (uploaded in 4 parts).
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.

(56) References Cited

OTHER PUBLICATIONS

Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Yufeng, Z. et al., "3G-Based Specialty Vehicles Real-Time Monitoring System", Applied Mechanics and Materials, Feb. 2014, vol. 513-517, pp. 871-875.
Yufeng, Z. et al., "3G-Based Specialty Vehicles Real-Time Monitoring System", Applied Mechanics and Materials, Feb. 2014, vol. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.

* cited by examiner

Safety Dashboard

Inbox (62) Starred Archived Dismissed 3 events selected ☆ Star | Archive | Dismiss

| | EVENT TYPE | EVENT TIME ▽ | DRIVER | VEHICLE | LOCATION |
|---|---|---|---|---|---|
| ☑ | Harsh Braking | Feb 13th, 2:01 pm | Anna | Truck 31345 | 73rd Avenue, Oakland, CA |
| ☐ | Harsh Braking | Feb 13th, 11:53 am | Oliver | Truck 15341 | San Francisco, CA |
| ☑ | Harsh Acceleration | Feb 13th, 10:11 am | Michael | Delivery 27329 | Oakland, CA |
| ☐ | Harsh Turn | Feb 13th, 9:02 am | Bo | Truck 54321 | Ulloa Street, San Francisco, CA |
| ☑ | Harsh Turn | Feb 12th, 5:32 pm | Shaquille | Truck 213231 | East Pacheco Boulevard (CA 33; CA 152), 5.4 mi E Los Banos, CA |
| ☐ | Harsh Acceleration | Feb 12th, 3:53 pm | Anthony | Wagon 84291 | Washington Avenue, San Leandro, CA |

FIG. 4

DYNAMIC DELIVERY OF VEHICLE EVENT DATA

TECHNICAL FIELD

Embodiments of the present disclosure relate to devices, systems, and methods that efficiently communicate data between a vehicle and a backend server.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transmitting asset data from a vehicle to a backend server is expensive, both in terms of use of available bandwidth (e.g., wireless or cellular bandwidth is limited based on carrier, geography, weather, etc.) and monetary cost for sending data (e.g., carrier cost per byte of data). Additionally, much of the asset data is not critical for immediate analysis. Furthermore, if all asset data is transmitted, bandwidth for those portions that are important for immediate analysis, and possibly feedback to the driver of the vehicle, may be slowed due to bandwidth or coverage constraints.

SUMMARY

The systems, methods, and devices described herein each have several aspects, no single one of which is solely responsible for its desirable attributes. Without limiting the scope of this disclosure, several non-limiting features will now be described briefly.

In one embodiment, an improved system and method of selectively transmitting sensor data from vehicle sensors to a backend server is described herein. The backend server may be configured to analyze the sensor data and selectively request further sensor data from the vehicle, such as to provide actionable data to a safety analyst, to allow updating and tuning of event detection models on the backend, and/or for other purposes. Thus, the amount of data transmitted to the backend server may be largely reduced, while maintaining the ability for the backend server to obtain as much data as needed. The system may incorporate a feedback mechanism that periodically updates event models used by the vehicle device to provide immediate in-vehicle alerts, such as when the backend server has optimized the event models based on analysis of data assets associated with many events.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. For example, as described above, existing machine vision systems are limited in various ways, and various embodiments of the present disclosure provide significant improvements over such technology, and practical applications of such improvements. Additionally, various embodiments of the present disclosure are inextricably tied to, and provide practical applications of, computer technology. In particular, various embodiments rely on detection of user inputs via graphical user interfaces, operation and configuration of machine vision devices, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 illustrates an example Safety Dashboard configured to list the most recent safety events detected across a fleet of vehicles that are associated with a safety manager.

DETAILED DESCRIPTION

Figure 1A:
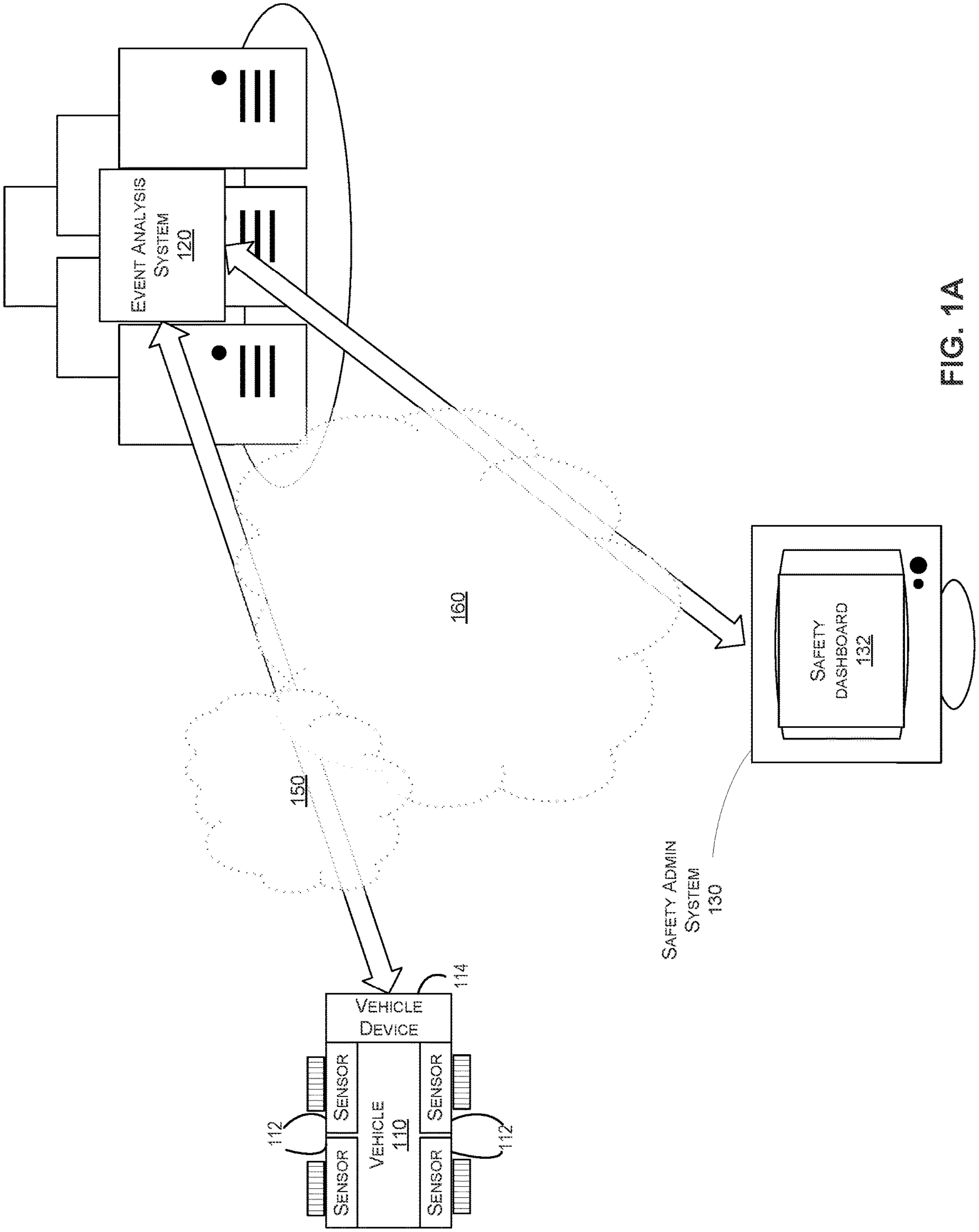
FIG. 1A illustrates an event analysis system in communication with a vehicle device and a safety admin system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As mentioned above, according to various embodiments, an improved system and method of selectively transmitting asset data from one or more sensors associated with the vehicle to a backend server, which is configured to analyze the asset data and, if necessary for further analysis of the asset data (e.g., to determine whether a safety event has occurred), requests further asset data from the vehicle. In some safety event detection systems, many of the data assets uploaded are associated with false positive events. Additionally, all data assets associated with true positive events do not necessarily add value to a safety dashboard.

A backend (or "cloud") server may have context and perspective that individual vehicle devices do not have. For example, the backend may include data associate with a large quantity of vehicles, such as vehicles across a fleet or within a geographic area. Thus, the backend may perform analysis of data assets across multiple vehicles, as well between groups of vehicles (e.g., comparison of fleets operated by different entities). The backend can use uploaded data assets to optimize for both customer experience and data transfer quantity. For example, using metadata from a harsh event (whether false or positive harsh event), the backend can make an informed go/no-go decision on whether a particular event should be shown in a safety dashboard or whether it may be a false positive. The backend may then decide whether data assets associated with the safety event should be transmitted from the vehicle device to the backend, for example only if the detected event is a positive event or an event meeting certain criteria. Thus, the amount of data transmitted to the backend server may be largely reduced, while maintaining the ability for the backend server to obtain as much data as needed to apply alert criteria and transmit corresponding alerts. An event analysis system may also include a feedback system that periodically updates event models used by vehicle devices to provide immediate in-vehicle alerts, such as when the backend server has optimized an event model based on analysis of data assets associated with many safety events, potentially across multiple fleets of vehicles.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit event data to a backend (or "cloud" server). Vehicle devices also include memory for storing software code that is usable to execute one or more event detection models that allow the vehicle device to trigger events without communication with the backend. A vehicle device may also store data supplied from the backend, such as map data, speed limit data, traffic rules data, and the like. Such data may be used at the vehicle device to determine if triggering criteria for an event have been matched.

Events of interest (or "event") are, generally, circumstances of interest to a safety advisor, fleet administrator, vehicle driver, or others. Events may be identified based on various combinations of characteristics associated with one or more vehicles. For example, a safety event associated with a vehicle may occur when the vehicle is moving at a speed that is more than 20 mph above the speed limit.

Safety Event: an event that indicates an accident involving a vehicle, such as a crash of the vehicle into another vehicle or structure, or an event that indicates an increased likelihood of a crash of vehicle.

Driver Assistance Event: one type of safety event that does not necessarily indicate a crash, or imminent crash, but indicates that the driver should take some action to reduce likelihood of a crash. For example, driver assistance events may include safety events indicating that a vehicle is tailgating another vehicle, the vehicle is at risk of a forward collision, or the driver of the vehicle appears distracted.

Harsh Event: one type of safety event indicating an extreme action of a driver and/or status of a vehicle. Harsh events may include, for example, detecting that a driver has accelerated quickly, has braked extensively, has made a sharp turn, or that the vehicle has crashed.

Event Model (or "triggering criteria"): a set of criteria that may be applied to data assets to determine when an event has occurred. An event model may be a statistical model taking as input one or more types of vehicle data. An event model may be stored in any other format, such as a list of criteria, rules, thresholds, and the like, that indicate occurrence of an event. An event model may additionally, or alternatively, include one or more neural networks or other artificial intelligence.

Event Data: data associated with an event. Event data may include data assets (e.g., photographs, video files, etc.) associated with a detected safety event. Event data may include data assets that were used by an event model to trigger a safety event. Event data may also include metadata regarding a detected event.

Sensor Data: any data obtained by the vehicle device, such as asset data and metadata.

Asset Data: any data associated with a vehicle, such as data that is usable by an event model to indicate whether a safety event has occurred. Data assets may include video files, still images, audio data, and/or other data files. In some implementations, asset data includes certain metadata, as defined below. Data assets may include:

Video files, which may be uploaded for each camera and may be controllable individually. Video files that are uploaded to the backend may be set to a default length (e.g., 3 seconds before and 3 seconds after the detected safety event) and/or may be selected based on rules associated with the detected event. Video transcode may be customized, at the vehicle device and/or by the backend, to adjust the bit rate, frame rate, resolution, etc. of video files that are transmitted to the backend.

Still Images from each camera, e.g., single frames of a video file, may be transmitted to the backend either as part of initial event data transmitted to the backend after detecting a safety event and/or in response to a request for still images from the backend. In situations where the backend requests still images from a vehicle device, the backend may determine image settings (e.g., image quality, down sampling rate, file size, etc.), as well as timeframe from which images are requested (e.g., one image every 0.2 seconds for the five section time period preceding the detected event).

Audio data can be combined with video, or sent separately and transcoded into video files after the fact. The backend may determine audio transcoding parameters for requested audio data.

Metadata: data that provides information regarding a detected event, typically in a more condensed manner than the related data assets. Metadata may include, for example, accelerometer data, global positioning system (GPS) data, ECU data, vehicle data (e.g., vehicle speed, acceleration data, braking data, etc.), forward camera object tracking data, driver facing camera data, hand tracking data and/or any other related data. For example, metadata regarding a triggered event may include a location of an object that triggered the event, such as a vehicle in which a FCW or Tailgating safety event has triggered, or position of a driver's head when a distracted driver event has triggered. Metadata may also include calculated data associated with a detected safety event, such as severity of the event, which may be based on rules related to duration of an event, distance to a leading vehicle, or other event data. Metadata may include information about other vehicles within the scene in the case of tailgating or FCW event, as well as confidence levels for these detections. Metadata may include confidence and headpose for a driver in the case of distracted driver event. Metadata may also include information such as event keys and other identification information, event type, event date and time stamps, event location, and the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Event Analysis System

FIG. 1A illustrates an event analysis system 120 in communication with a vehicle device 114 and a safety admin system 130. In this embodiment, the vehicle 110 includes a vehicle device 114, which may physically incorporate and/or be coupled to (e.g., via wired or wireless communication channel) a plurality of sensors 112. The sensors 112 may include, for example, a forward facing camera and a driver facing camera. The vehicle device 114 further includes one or more microprocessors in the communication circuit configured to transmit data to the event analysis system 120, such as via one or more of the networks 150, 160. In this example, a safety dashboard 132 may be generated on a safety admin system 130 to illustrate event data from the event analysis system 120, such as via an online portal, e.g., a website or standalone application. The safety admin system 130 may be operated, for example, by a safety officer that reviews information regarding triggered safety events associated with a fleet of drivers/vehicles.

Various example computing devices 114, 120, and 130 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment (e.g., the safety dashboard 130, the event analysis system 120, etc.) via various computing devices. Such interactions may typically be accomplished via interactive graphical user interfaces, however alternatively such interactions may be accomplished via command line, and/or other means.

As shown in the example of FIG. 1A, communications between the vehicle device 114 and event analysis system 120 primarily occurs via network 150, while communication between the event analysis system 120 and safety admin system 130 typically occurs via network 160. However, networks 150, 160 may include some or all of the same communication protocols, services, hardware, etc. Thus, although the discussion herein may describe communication between the vehicle device 114 and the event analysis system 120 via the network 150 (e.g., via cellular data) and communication between the event analysis system 120 and the safety admin system 130 via a wired and/or a wireless high-speed data communication network, communications of the devices are not limited in this manner.

Figure 1B:
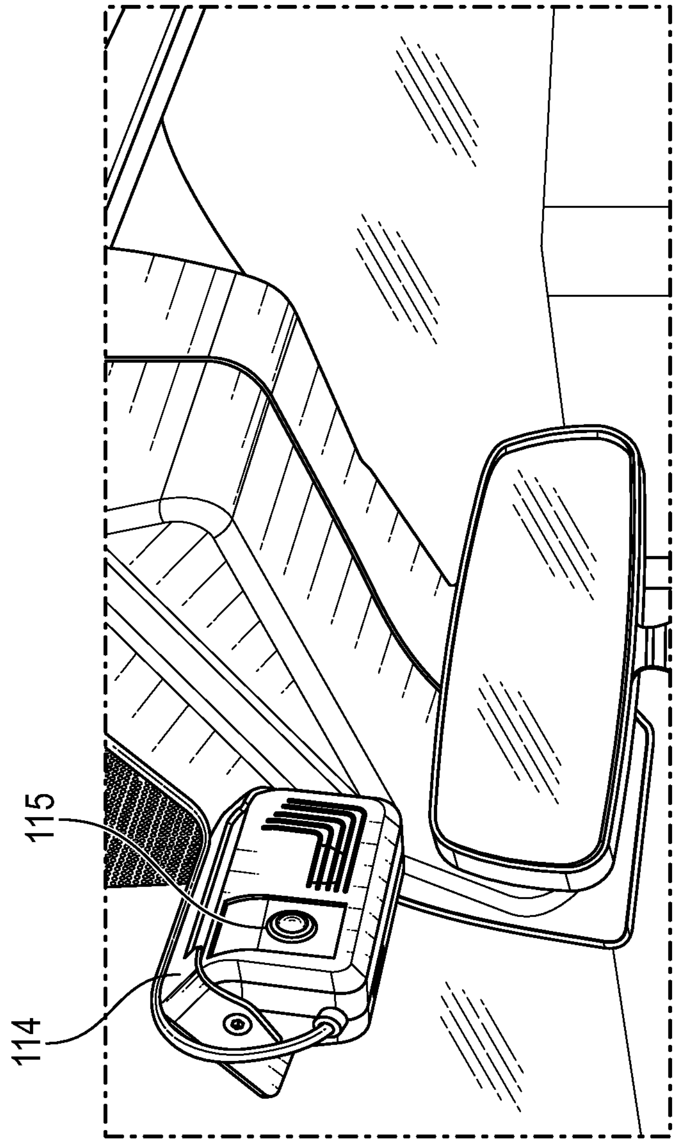
FIG. 1B illustrates an example vehicle device mounted inside a vehicle.

FIG. 1B illustrates an example vehicle device 114 mounted inside a vehicle. In this example, the vehicle device 114 includes a driver facing camera 115 and one or more outward facing cameras (not shown). In other embodiments, the vehicle device may include different quantities of video and/or still image cameras. These dual-facing cameras (e.g., the driver facing camera 115 and one or more outward-facing cameras) may be configured to automatically upload and/or analyze footage of safety events. Furthermore, the event data that is uploaded to the event analysis system 120 may be analyzed to discover driving trends and recommendations for improving driver safety. In some embodiments, one or more of the cameras may be high-definition cameras, such as with HDR and infrared LED for night recording. For example, in one embodiment the outward-facing camera includes HDR to optimize for bright and low light conditions, while the driver-facing camera includes infrared LED optimized for unlit nighttime in-vehicle video.

Vehicle device 114 may include, or may be in communication with, one or more accelerometers, such as accelerometers that measure acceleration (and/or related G forces) in each of multiple axes, such as in an X, Y, and Z axis. The vehicle device 114 may include one or more audio output devices, such as to provide hands-free alerts and/or voice-based coaching. The vehicle device may further include one or more microphones for capturing audio data. The vehicle device includes one or more computer processors, such as high-capacity processors that enable concurrent neural networks for real-time artificial intelligence.

In some embodiments, the vehicle device transmits encrypted data via SSL (e.g., 256-bit, military-grade encryption) to the event analysis system 120 via high-speed 4G LTE or other wireless communication technology, such as 5G communications. The network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network 160 may similarly include any wired network, wireless network, or combination thereof. For example, the network 160 may comprise one or more local area networks, wide area network, wireless local area network, wireless wide area network, the Internet, or any combination thereof.

Example Event Data Communications

Figure 2:
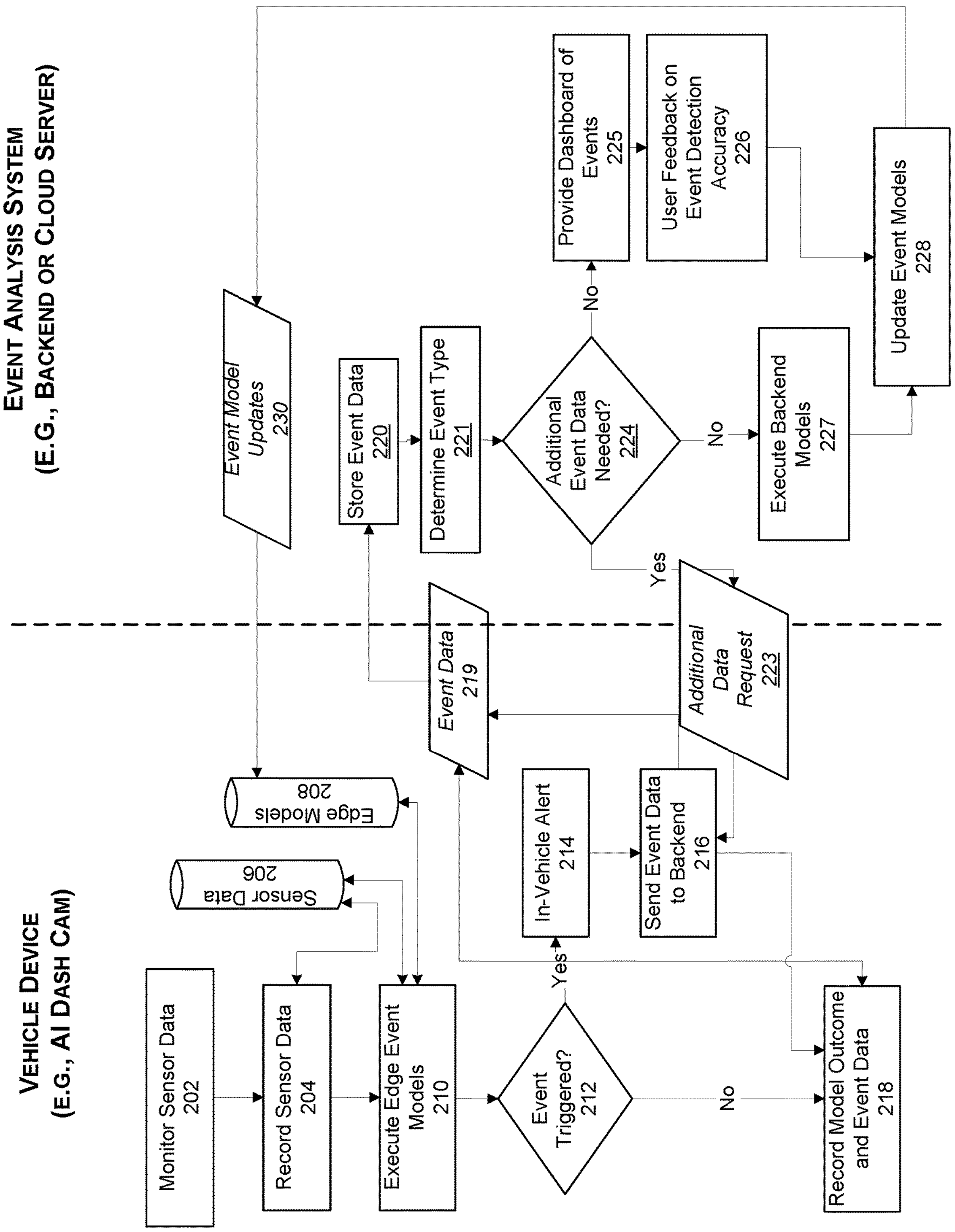
FIG. 2 is a flow diagram illustrating an example process for communicating event data between a vehicle device and an event analysis system.

FIG. 2 is a flow diagram illustrating an example process for communicating event data between a vehicle device and an event analysis system. In general, the processes illustrated on the left are performed by the vehicle device, while processes on the right are performed by an event analysis system. Depending on the embodiment, the method may include fewer or additional blocks and the blocks may be performed in an order different than is illustrated.

Beginning at block 202, sensor data (e.g., accelerometer data) is monitored by the vehicle device. For example, sensor data output from the multiple sensors 112 associated with the vehicle device 114 of FIG. 1A may be monitored and recorded at block 204. As shown, at least some of the asset data is stored in a sensor data store 206. For example, accelerometer data for a particular time period (e.g., 2, 12, 24 hours, etc.) may be stored in the sensor data store 206. Similarly, asset data, such as video data for a particular time period may be stored in the sensor data store 206.

Next, at block 210, one or more event models are executed on the sensor data. In this example, the sensor data is accessible via the sensor data store 206. The event models executed at block 210 are configured to identify harsh events indicative of a sudden, extreme, and/or unexpected movement of the vehicle and/or driver. In some embodiments, the event models are configured to trigger a harsh event based on the level of G forces sensed within the vehicle. For example, in some embodiments the vehicle device includes accelerometers that sense acceleration in each of three dimensions, e.g., along an X, Y, and Z axis. In some embodiments, the acceleration data (e.g., in $m/s^2$) is converted to g-force units (Gs) and the thresholds for triggering harsh events are in Gs. In some embodiments, a harsh event may be associated with a first acceleration threshold in the X axis, a second acceleration threshold in the Y axis, and/or a third acceleration threshold in the Z axis. In some implementations, a crash harsh event may be triggered with acceleration thresholds reached in at least two, or even one, axis. Similar acceleration thresholds in one or more of the X, Y, and Z axes are associated with other harsh events, such as harsh acceleration, harsh breaking, and harsh turning. In some embodiments, gyroscope data (e.g., orientation, angular velocity, etc.) may be used by event models, such as to detect an event based on a combination of gyroscope and acceleration data, or any other combination of data.

Figure 3:
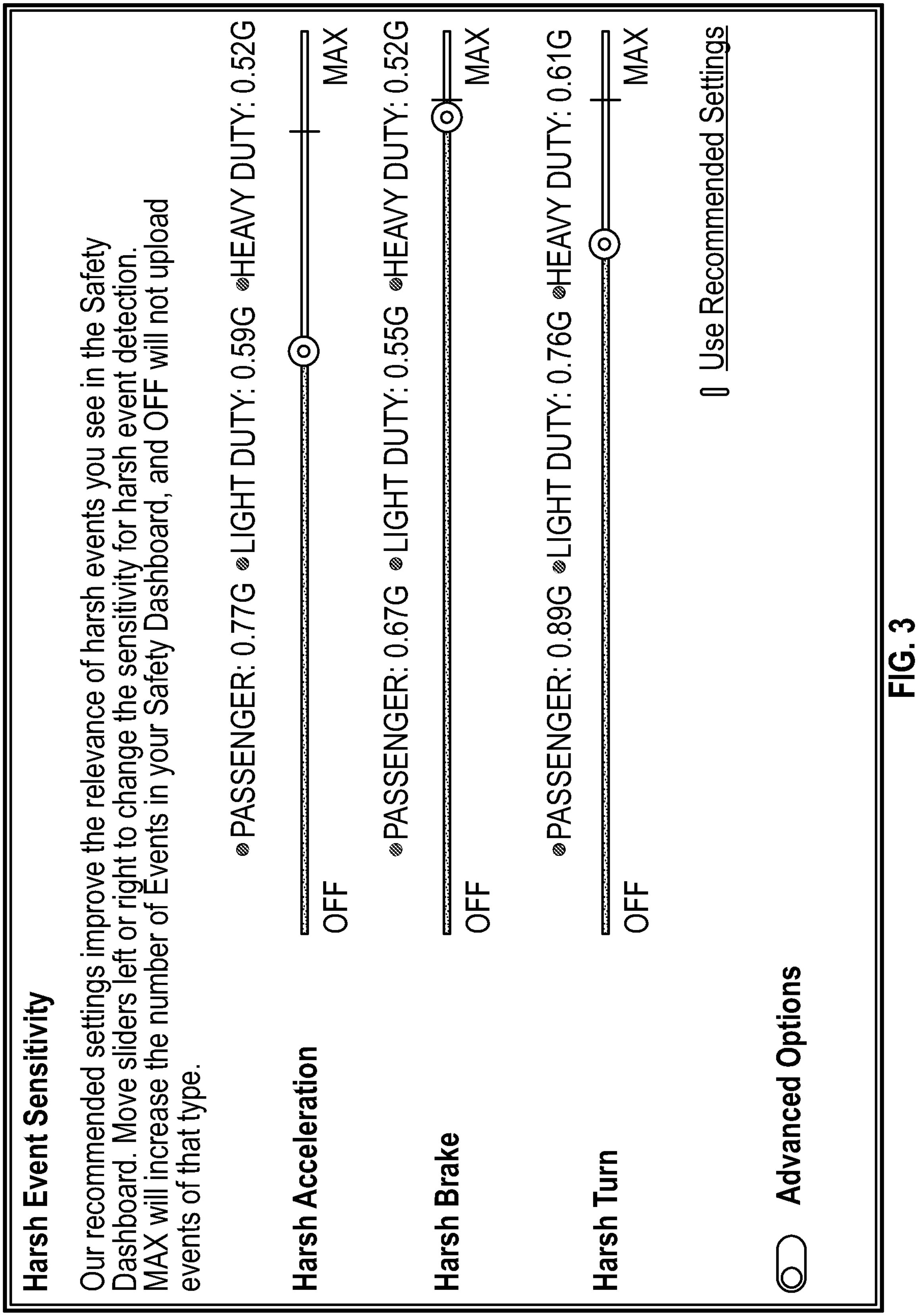
FIG. 3 is an example user interface that may be accessed by a user to designate harsh event customizations for a particular vehicle or group of vehicles (e.g., a fleet of similar delivery trucks).

In some embodiments, the thresholds are determined by a user configurable setting, allowing the user (e.g., an owner or manager of a fleet) to either use defaults based on vehicle type (e.g., passenger, light duty or heavy duty), or to set custom combinations of acceleration thresholds that must be met to trigger an associated harsh event. For example, a user may set triggering thresholds for harsh events via the safety dashboard 132. FIG. 3 is an example user interface that may be accessed by a user to designate harsh event customizations for a particular vehicle or group of vehicles (e.g., a fleet of similar delivery trucks). In this example, the user may select a threshold acceleration (in this example shown in G forces) for each of three different harsh events, namely acceleration, breaking, and turning. The user interface provides default levels based on type of vehicle, which the user can choose to implement and/or can move the sliders associated with the three different types of harsh events to select a custom G force level. In this example, G force levels in the X axis (e.g., corresponding to a length of a vehicle) may be used to trigger the harsh acceleration and harsh breaking events, while G force levels in the Y axis (e.g., perpendicular to the X axis) may be used to trigger the harsh turn event. In some embodiments, a particular harsh event may not be triggered until multiple G force levels reach a threshold, such as a X and z axis threshold that may be associated with a harsh turn event.

In some embodiments, harsh event models (e.g., rules, algorithms, criteria, psuedocode, etc.) may only trigger safety events when the vehicle device is currently "on a trip", which may be defined by one or more thresholds that are set to default levels and, in some implementations, may be customized by the user. For example, if the vehicle has a speed that is greater than zero, the vehicle may be deemed on a trip. As another example, GPS movement may be used to determine whether the vehicle is on a trip, alone or in combination with other data, such as vehicle speed and/or any other available data. In some embodiments, harsh events are only triggered when the vehicle is moving faster than a floor threshold, such as greater than 5 mph, to reduce noise and false positives in triggered safety events. In some embodiments, the vehicle device is calibrated when initially positioned in the vehicle, or moved within the vehicle, to determine the orientation of the vehicle device within the vehicle, e.g., to define the X, Y, and Z axes of the vehicle with reference to the vehicle device. This orientation may be important for proper scaling and calculation of G forces. In some embodiments, harsh events may not be triggered until proper calibration of the vehicle device is completed.

Moving to block 212, if a harsh event has been triggered, the method continues to block 214 where an in-vehicle alert 214 may be provided within the vehicle and event data associated with the harsh event is identified and transmitted to the event analysis system (block 216). The in-vehicle alerts may be customized, such as based on the type of triggered event, severity of the event, driver preferences, etc. For example, in-vehicle alerts may include various audible signals and/or visual indicators of triggered safety events. In some implementations, the event data 219 that is transmitted to the event analysis system includes metadata associated with the triggered event. For example, the metadata may include a triggering reason (e.g., an indication of which harsh event was triggered) and acceleration data in at least the axis associated with the triggered acceleration threshold. Additional metadata, such as location of the vehicle (e.g., from a GPS sensor), speed of the vehicle, and the like, may also be included in event data 219. In some embodiments, event data that is transmitted to the event analysis system is selected based on settings of the triggered safety event. For example, a first harsh event may indicate that the event data 219 that is initially transmitted to the event analysis system comprises particular metadata, e.g., accelerometer data, for a first time frame (e.g., from five seconds before the event triggered until two seconds after the event triggered). Similarly, a second harsh event may indicate that the event data 219 that is initially transmitted to the event analysis system comprises a different subset of metadata for a different time frame. Additionally, the event data to 19 that is initially transmitted to the event analysis system may include data assets, such as one or more frames of video data from one or more of the forward-facing and/or driver-facing cameras.

In some embodiments, the vehicle device executes rules (or event models in other formats) that determine whether even the metadata is transmitted to the event analysis system. For example, a rule may indicate that triggering of a particular event type that has not been detected during a predetermined time period should not initiate transmission of event data 219 to the event analysis system. Rather, the rule may indicate that the in-vehicle alert 214 is provided to the driver as a "nudge" to correct and/or not repeat actions that triggered the safety event. The rules may further indicate that upon occurrence of the same safety event within a subsequent time period (e.g., 30 minutes, 60 minutes, etc.) causes event data 219 regarding both of the detected events to be transmitted to the event analysis system. Similarly, rules may be established to transmitted event data 219 only upon occurrence of other quantities of safety events (e.g., three, four, five, etc.) during other time periods (e.g., 10 minutes, 20 minutes, 60 minutes, two hours, four hours, etc.). Such rules may further be based upon severity of the triggered safety events, such that a high severity harsh event may be transmitted immediately to the event analysis system, while a low severity harsh event may only be transmitted once multiple additional low severity harsh events are detected.

In some embodiments, asset data, such as video and audio data, are recorded in the sensor data store 206, even though such asset data may not be transmitted to the event analysis system initially upon triggering of a harsh event (e.g., at block 216). However, in some implementations, asset data may be selected for upload to the event analysis system in response to detection of an event. For example, video data from a time period immediately preceding the detected event may be marked for transmission to the event analysis system. The asset data may be transmitted when the communication link supports transmission of the asset data, such as when the vehicle is within a geographic area with a high cellular data speed. Alternatively, the asset data may be transmitted when connected on a nightly basis, such as when the vehicle is parked in the garage and connected to Wi-Fi (e.g., that does not charge per kilobyte). Accordingly, the vehicle device advantageously provides immediate in-vehicle alerts upon detection of a harsh event, while also allowing the event analysis system to later receive asset data associated with the detected harsh event, such as to perform further analysis of the harsh event (e.g., to update harsh event models applied by the vehicle device) and/or to include certain data assets in a safety dashboard. In some implementations, the event data may be used for cross fleet analysis. For example, even if a particular fleet isn't concerned with events (or particular types of events), the event data may be usable as a reference for other fleets.

In some embodiments, once a particular asset data is transmitted to the event analysis system, that particular asset data is removed from the sensor data store 206 of the vehicle device. For example, if a five second video clip associated with a harsh event is transmitted to the event analysis system, that five second portion of the video stream may be removed from the sensor data store 206. In some embodiments, asset data is only deleted from the vehicle device when event analysis system indicates that the particular asset data may be deleted, or until the asset data has become stale (e.g., a particular asset data is the oldest timestamped data in the sensor data store 206 and additional storage space on the sensor data store 206 is needed for recording new sensor data).

In the embodiment of FIG. 2, the event analysis system receives the event data 219, which may initially be only metadata associated with a harsh event, as noted above, and stores the event data for further analysis at block 220. The event data may then be used to perform one or more processes that provide further information to a user (e.g., a safety manager associated with a vehicle in which the safety event occurred) and/or are used to improve or update the event models executed on the vehicle device. For example, FIG. 4 illustrates an example Safety Dashboard configured to list the most recent safety events detected across a fleet of vehicles that are associated with a safety manager. In this example, harsh breaking, harsh turning, and harsh acceleration events occurring in vehicles driven by multiple drivers are identified. In some embodiments, a listed safety event may be selected to cause the safety dashboard to provide further details regarding the selected safety event. For example, event data, which may include asset data that is requested via the process discussed below, may be presented to the safety manager, such as to determine actions to be taken with the particular driver.

Moving to block 221, the event analysis system may first determine an event type associated with the detected safety event. The event type may then be used to select one or more event models to be tested or updated based on the event data. For example, event data associated with a tailgating event type may be analyzed using a tailgating model in the backend that is more sophisticated than the tailgating model used in the vehicle device. For example, the event models applied in the event analysis system (or backend event models) may take as inputs additional sensor data, such as video data, in detecting occurrence of safety events. Thus, the event models applied in the event analysis system may require additional event data beyond the initial event data received initially upon triggering of the safety event at the vehicle device. Thus, in the embodiment of FIG. 2, the event analysis system at block 224 determines if additional event data is needed to execute the selected backend event model. Additionally, the event analysis system may determine that additional asset data is needed for a safety dashboard, such as to provide further information regarding a detected event that is understandable by a safety officer. For example, audio data that was not part of the initial event data transmitted to the event analysis system may be indicated as required for a particular detected event type. Thus, the event analysis system may determine that a particular time segment of audio data should be requested from the vehicle device.

If additional event data is needed, a request for the particular event data is generated and transmitted in an additional data request 223 for fulfillment by the vehicle device. In some embodiments, the additional data request 223 includes specific asset data requirements, such as a time period of requested video or audio data, minimum and/or maximum resolution, frame rate, file size, etc. The additional asset data request may be fulfilled by the vehicle device at block 216 by sending further event data 219 to the event analysis system. This process may be repeated multiple times until the event data needed to evaluate the selected backend models and/or meet the minimum requirements for a safety dashboard is provided. Similarly, in some implementations an iterative loop may be performed (any number of times) where an event model determines that more data for a more complicated (or different) model is necessary, the additional data is requested and received, and the more complicated (or different) model is then evaluated.

In some embodiments, the event analysis system applies default and/or user configurable rules to determine which asset data is requested from the vehicle device. For example, a rule may be established that excludes requests for additional asset data when asset data for the same type of safety event has already been received during a particular time period. For example, the rules may indicate that asset data is requested only for the first 5 occurrence of harsh turning events during a working shift of a driver. Thus, the event analysis system receives additional asset data for some of the harsh turning events and preserves bandwidth and reduces costs by not requesting asset data for all of the harsh turning events, due to the limited value of analyzing the additional asset data associated with a recurring triggered safety event.

In some embodiments, an additional data request 223 includes an indication of urgency of fulfillment of the data request, such as whether the additional data (e.g., asset data or metadata) is needed as soon as possible or if acceptable to provide the asset data only when bandwidth for transmitting the asset data is freely available.

When sufficient event data is provided to the event analysis system, the selected backend models may be executed at block 227, and the asset data may be used in a safety dashboard at block 225. In some embodiments, execution of event models at the event analysis system comprises training one or more event models for better detection of the determined event type. For example, in some embodiments the event analysis system evaluates asset data that was not considered by the vehicle device in triggering the initial safety event. The event analysis system may provide suggestions and/or may automatically update event models that are restricted to analysis of certain event data (e.g., event metadata and/or certain types of asset data) based on analysis of asset data that is not analyzed by the updated event model. For example, analysis of video data associated with a safety event may identify correlations between features in the video data and acceleration data that may be used to update criteria or thresholds for triggering the particular safety event by the vehicle device (without the vehicle device analyzing video data). Advantageously, the backend may consider event data across large quantities of vehicles in determining updates to the event models that are executed on the vehicle device.

In some embodiments, event models include neural networks that are updated over time to better identify safety events. Thus, at block 227 in the example of FIG. 2, event data may become part of a training data set for updating/improving a neural network configured to detect the safety event. A number of different types of algorithms may be used by the machine learning component to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component. For example, the models can be regenerated on a periodic basis as new received data is available to help keep the predictions in the model more accurate as the data is collected over time. Also, for example, the models can be regenerated based on configurations received from a user or management device (e.g., 230).

Some non-limiting examples of machine learning algorithms that can be used to generate and update the models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms. These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate models without manual analysis or review by one or more people.

After execution of the backend models at block 227, event models associated with the determined event type may be updated at block 228, and in some embodiments certain of the updated event models 230 are transmitted back to the vehicle device for execution in determining future safety events. The safety dashboard that is provided at block 225 may include an option for the user to provide feedback on accuracy of the detected events, such as an indication of whether the safety event actually occurred or if the triggering event should be considered a false positive. Based on this user feedback, the event models may be updated at block 228, potentially for transmission back to the vehicle device as part of event model updates 230.

Figure 5:
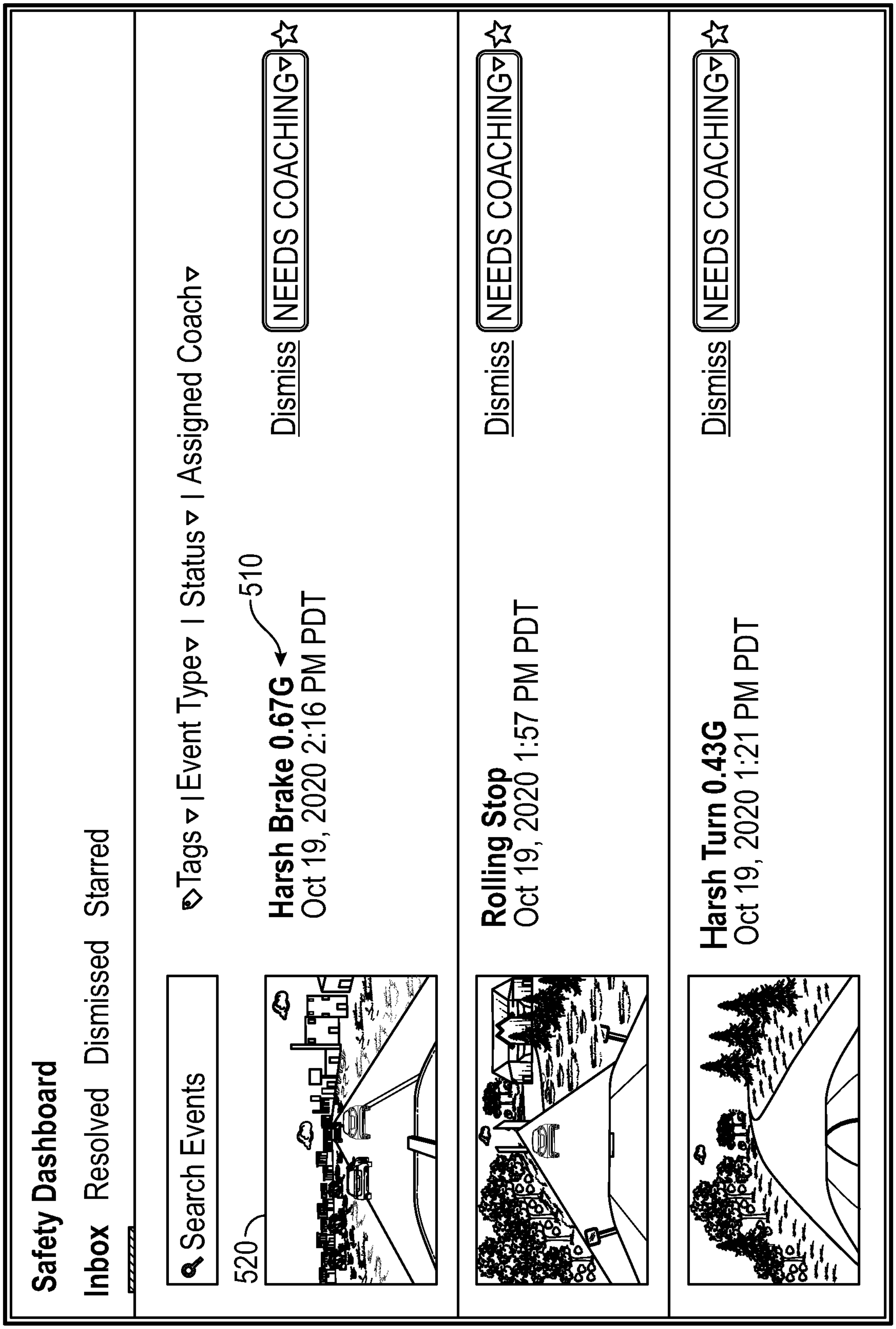
FIG. 5 is another example user interface that provides information regarding recently detected safety events for which coaching is indicated.

Example User Interfaces as noted above, FIG. 4 is an example user interface of a safety dashboard that provides an overview of the most recent harsh events detected. FIG. 5 is another example user interface that provides information regarding recently detected safety events for which coaching is indicated. In some embodiments, the dashboard of FIG. 5 is presented to a safety officer responsible for optimizing safety for a fleet of vehicles. As shown in FIG. 5, information regarding a first harsh event 510, harsh braking in this case, is provided. The information may include any of the event data that is been provided to the event analysis system. For example, information 510 includes metadata that was received initially from the vehicle device upon triggering of the harsh braking event. Advantageously, the event analysis system requested further event data from the vehicle device, including a video clip and/or snapshot 520 from the forward-facing camera of the vehicle device. Thus, the safety officer is able to view video data obtained at the same time as the harsh braking event was detected in order to develop a strategy for coaching the driver. In other embodiments, any other sensor data may be included in a safety dashboard.

Figure 6:
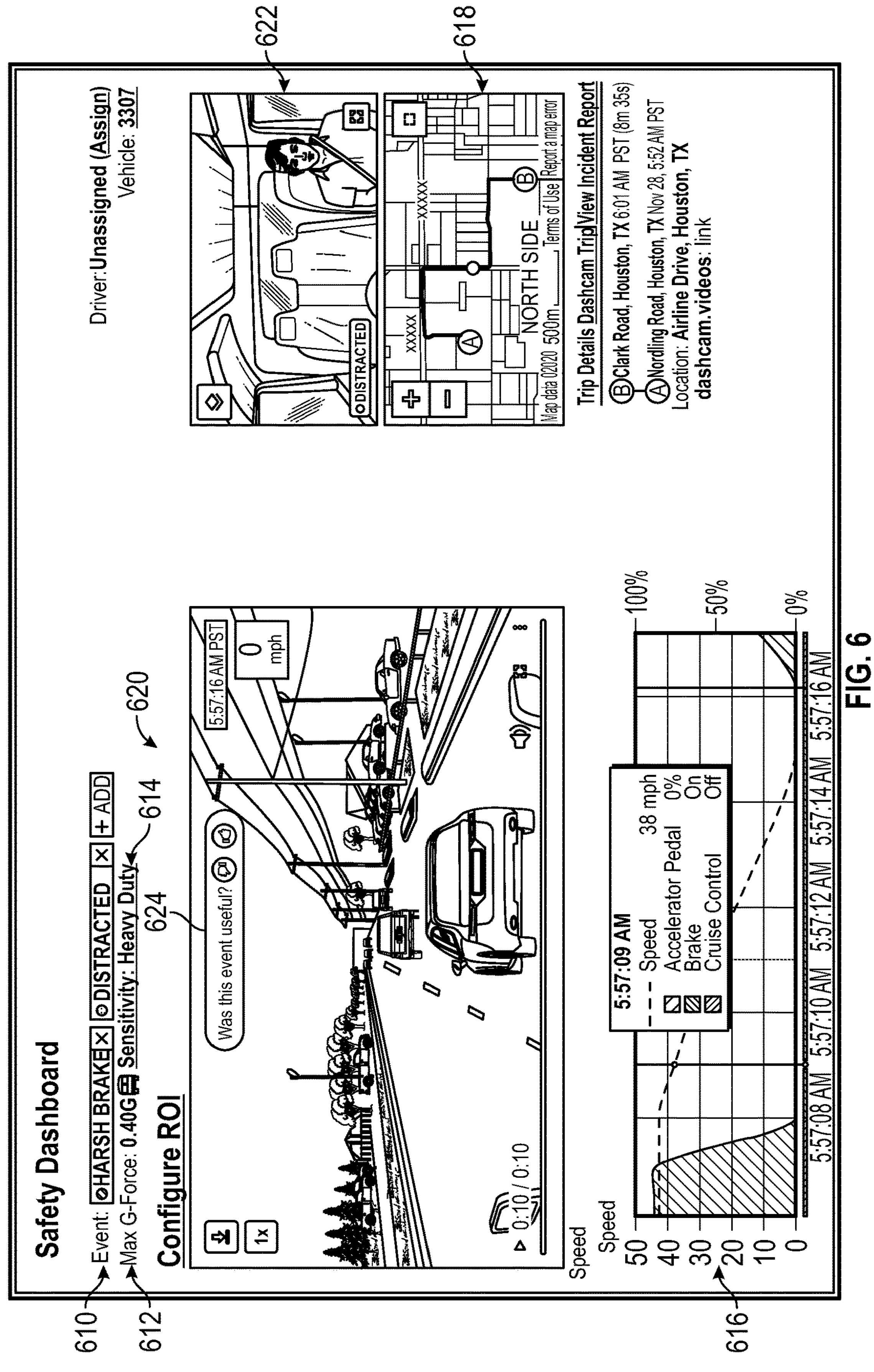
FIG. 6 is an example user interface that provides information regarding a detected safety event, including both event metadata and asset data, and provides an option for the user to provide feedback on whether the provided alert data was helpful.

FIG. 6 is an example user interface that provides information regarding a detected safety event, including both event metadata and asset data, and provides an option for the user to provide feedback on whether the provided alert data was helpful. In this example, the event type 610 is indicated as both a harsh braking and a distracted driver safety event. Additionally, the dashboard provides the maximum G force 612 detected during the event, as well as the default event model settings 614 used in detecting the event. In this example, a time series graph 616 of certain metadata associated with the detected event is illustrated. The charted metadata in graph 616 includes speed, accelerator pedal usage, brake activation indicator, and cruise control activation indicator. In other embodiments, other metadata may be charted, such as based on user preferences. In the example of FIG. 6, metadata indicating location of the vehicle (e.g., GPS data) before and after the detected event is provided in a map view 618 and video data associated with the detected event is provided in forward-facing video 620 and driver-facing video 622. Thus, the user interface brings together not only the initial metadata that was transmitted by the vehicle device after detection of the safety event, but subsequent data assets that were requested by the event analysis system. In some embodiments, the displayed data is synchronized, such that each of the forward-facing video 620, driver-facing video 622, map view 618, and time series graph 616 each depict information associated with a same point in time (e.g., a particular time during the ten seconds of event data associated with a detected safety event). As noted above, the user may interact with pop-up 624 to provide feedback to the event analysis system that may be used in updating and/or optimizing one or more event models.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method performed by an event analysis system having one or more hardware computer processors and one or more non-transitory computer readable storage device storing software instructions executable by the event analysis system, the method comprising:

generating user interface data configured to display one or more user interfaces indicating at least:
- a first safety event type,
- a first threshold,
- a first user adjustable control configured to receive first input from a user to adjust the first threshold;
- a second safety event type,
- a second threshold, and
- a second user adjustable control configured to receive second input from the user to adjust the second threshold;

determining the first threshold and the second threshold based on user input via the one or more user interfaces;

providing the first and second thresholds to each of a plurality of safety event detection devices, wherein a first safety event detection device associated with a first vehicle is configured to,
- in response to first sensor data associated with the first vehicle exceeding the first threshold, determining first asset data associated with the first safety event type, and transmit the first asset data to the event analysis system; and
- in response to second sensor data associated with the first vehicle exceeding the second threshold, determining second asset data associated with the second event type, and transmit the second asset data to the event analysis system.

2. The method of claim 1, the first threshold indicates a G force threshold.

3. The method of claim 1, wherein the first threshold is associated with a first type of vehicle.

4. The method of claim 1, wherein the one or more user interfaces further includes a reset control that selectable by to set the first threshold to a first default threshold and to set the second threshold to a second default threshold.

5. The method of claim 1, wherein the one or more user interfaces further indicates:

a third safety event type, a third threshold, a third user adjustable control configured to receive third input from a user to adjust the third threshold.

6. The method of claim 5, wherein the first safety event type is harsh acceleration, the second safety event type is harsh braking, and the third safety event type is harsh turning.

7. The method of claim 1, wherein the first user adjustable control is a slider.

8. The method of claim 1, wherein the first asset data includes one or more of: video files, still images, audio data, accelerometer data, global positioning system (GPS) data, ECU data, vehicle speed data, forward camera object tracking data, driver facing camera data, and hand tracking data.

9. A computerized method, performed by a computing system having one or more hardware computer processors and one or more non-transitory computer readable storage device storing software instructions executable by the computing system to perform the computerized method comprising:

generating user interface data configured to display one or more user interfaces indicating at least:

a first safety event type;

a first vehicle type;

a first threshold;

a first user adjustable control configured to receive first input from a user to adjust the first threshold associated with the first vehicle type;

a second vehicle type;

a second threshold; and a second user adjustable control configured to receive second input from the user to adjust the second threshold associated with the second vehicle type;

determining the first threshold and the second threshold based on user input via the one or more user interfaces;

providing the first and second thresholds to each of a plurality of safety event detection devices;

wherein a first safety event detection device associated with a first vehicle of the first vehicle type is configured to, in response to first sensor data associated with the first vehicle exceeding the first threshold, determine first asset data to transmit to an event analysis system; and wherein a second safety event detection device associated with a second vehicle of the second vehicle type is configured to, in response to second sensor data associated with the second vehicle exceeding the second threshold, determine second asset data to transmit to the event analysis system.

10. The method of claim 9, wherein the first safety event type is harsh braking, harsh acceleration, or harsh turning.

11. The method of claim 9, wherein the first vehicle type is passenger, light duty, or heavy duty.

12. The method of claim 9, the first threshold indicates a G force threshold.

13. The method of claim 9, wherein the first asset data are received via a cellular data communication network.

14. The method of claim 9, wherein the first asset data includes at least some of the first sensor data.

15. The method of claim 14, wherein the first asset data includes at least one video file.

16. A system having a hardware computer processor and a non-transitory computer readable medium having software instructions stored thereon, the software instructions executable by the hardware computer processor to cause the system to perform operations comprising:

generating user interface data configured to display one or more user interfaces indicating at least:

a first safety event type, a first threshold, a first user adjustable control configured to receive first input from a user to adjust the first threshold;

a second safety event type, a second threshold, and a second user adjustable control configured to receive second input from the user to adjust the second threshold;

determining the first threshold and the second threshold based on user input via the one or more user interfaces;

providing the first and second thresholds to at least a first safety event detection device;

wherein a first safety event detection device associated with a first vehicle is configured to, in response to first sensor data associated with the first vehicle exceeding the first threshold, determining first asset data associated with the first safety event type, and transmit the first asset data to an event analysis system; and in response to second sensor data associated with the first vehicle exceeding the second threshold, determining second asset data associated with the second safety event type, and transmit the second asset data to the event analysis system.

17. The system of claim 16, wherein the first sensor data includes one or more of: video files, still images, audio data, accelerometer data, global positioning system (GPS) data, ECU data, vehicle speed data, forward camera object tracking data, driver facing camera data, and hand tracking data.

18. The system of claim 16, wherein the first asset data includes at least some of the first sensor data and sensor data from one or more additional sensors.

19. The system of claim 16, wherein the first sensor data comprises accelerometer data.

20. The system of claim 16, wherein the first safety event type is one or more of a collision, harsh acceleration, harsh braking, or harsh turning.

* * * * *